US008180661B2

(12) United States Patent
Thielges et al.

(10) Patent No.: US 8,180,661 B2
(45) Date of Patent: May 15, 2012

(54) SYSTEM AND METHOD FOR MANAGING PROPERTY

(75) Inventors: Bart C. Thielges, San Jose, CA (US); David S. George, Santa Clara, CA (US); Thomas C. Siffermann, Jr., San Jose, CA (US)

(73) Assignee: Landport Systems, Inc., Walnut Creek, CA (US)

( * ) Notice: Subject to any disclaimer, the term of this patent is extended or adjusted under 35 U.S.C. 154(b) by 2120 days.

(21) Appl. No.: 09/938,265

(22) Filed: Aug. 23, 2001

(65) Prior Publication Data

US 2002/0138289 A1 Sep. 26, 2002

Related U.S. Application Data

(60) Provisional application No. 60/227,457, filed on Aug. 23, 2000.

(51) Int. Cl.
*G06Q 10/00* (2012.01)
(52) U.S. Cl. ........ 705/7.13; 705/314; 705/313; 705/305
(58) Field of Classification Search .............. 705/7.13, 705/313, 314, 305
See application file for complete search history.

(56) References Cited

U.S. PATENT DOCUMENTS

| | | | | |
|---|---|---|---|---|
| 4,837,797 A | * | 6/1989 | Freeny, Jr. ............ | 379/93.17 |
| 5,838,314 A | * | 11/1998 | Neel et al. ............ | 725/8 |
| 5,878,215 A | * | 3/1999 | Kling et al. ........... | 709/207 |
| 6,219,648 B1 | * | 4/2001 | Jones et al. ........... | 705/8 |
| 6,611,275 B1 | * | 8/2003 | Zey et al. ............. | 715/752 |
| 6,990,458 B2 | * | 1/2006 | Harrison et al. ....... | 705/8 |

OTHER PUBLICATIONS

Corrigo Unveils Compelling Maintenance and Customer Service Solution for Property Managers at MultiTech 2000. Business Editors/High-tech Writers MultiTech 2000. Business Wire. New York: Mar. 16, 2000. from proquest.*
Corrigo Streamlines Service Delivery Throughout BRE Properties' Multifamily Portfolio. Business Editors. Business Wire. New York: Jul. 19, 2000 from proquest.*
Corrigo Announces First Pilot Customer, BRE Properties, Inc.; Web-based Solution Provider Enhances BRE's Status as Leader in Technological Innovation for the Real Estate Industry. Business Wire. Jan. 18, 2000 from Dialog file 16: 06945715.*
AMLI Residential Launches New Web Site. PR Newswire. Sep. 7, 1999. from Dialog file 20: 07090269.*
Buildinglink.com, 2000, screen shots.*
BJM Central, bjmurray.com, May 10, 1999.*

* cited by examiner

*Primary Examiner* — Johnna Loftis
(74) *Attorney, Agent, or Firm* — Mark A. Thomas

(57) ABSTRACT

A system and method for managing property that in one embodiment provides a network-based system and method for creating, tracking and managing events, known herein as "incidents", such as service requests, maintenance reminders and other events associated with managing property for supporting and enhancing the functions of tenant, property manager and vendor.

7 Claims, 21 Drawing Sheets

SYSTEM AND METHOD FOR MANAGING PROPERTY

CROSS-REFERENCE TO RELATED APPLICATION(S)

This application claims the benefit of U.S. Provisional Patent Application No. 60/227,457, filed Aug. 23, 2000.

TECHNICAL FIELD

The present invention provides a network-based system and method for creating and tracking and managing events associated with managing property.

BACKGROUND OF THE INVENTION

Currently in the United States there are billions of square feet of tenant occupied (or controlled) real estate in both commercial and residential settings. These properties are managed by a variety of entities including public and private real estate investment trusts ("REITs"), property management companies, private property owners, etc. The management of these properties typically includes providing maintenance and repair of various building systems enjoyed by tenants such as electrical power, water, HVAC, etc. Often times the buildings or the land that they reside on will also require maintenance and repair. Depending of the size of the building and the nature of its use, the number of service requests being performed can be substantial, especially over time.

Unfortunately, even in large facilities, maintenance and repair tasks are often requested, scheduled, tracked, performed and checked in an ad hoc manner. By way of a hypothetical, but illustrative example, a tenant has noticed a failed light fixture in a tenant-occupied office building. The tenant looks up the property manager's phone number and ends up leaving a voice mail message for property manager because he/she is working on other issues. When the property manager receives the voice mail message he/she calls a service vendor he/she is comfortable with, in this case an electrician. A number of conversations and exchanged voice mails take place until the tenant, property manager and electrician schedule a time to perform the necessary servicing at an expected price. The request for service and its scheduled repair may be recorded in a notebook, an electronic organizer and on a task list by the tenant, property manager and electrician, respectively. Once the task has been completed by the electrician, he/she will generate an invoice to the property manager or accounts payable department who does not contact the tenant to inquire about the completion of the requested task and the quality of the service provided. The property manager approves the electrician's invoice and the accounts payable department records the approval and issues the appropriate compensation. In this example, information about the problem and its servicing is recorded in an ad hoc fashion in different unrelated systems both within the property manager's organization and between the tenant, service vendor and property manager.

The current ad hoc system, while pervasive, has significant number of shortcomings and inefficiencies. Often, service requests are either not logged and tracked, or if they are, it likely requires a separate entry of data by the property manager into a computer program that itself required installation and maintenance. Importantly, the tenant, property manager and service vendor may all have different versions of the service required and status. Discrepancies between what the service required is and the status of repairs are a source of inefficiency and frustration for all parties. Once the work is completed, clear and consistent records are often not kept to permit analysis of service request and vendor performance patterns. The current ad hoc system also often fails to provide fast and timely updates. Another failure of the current system is the often unaddressed need to formalize procedures so important points are not overlooked, such as asking the tenant for feedback.

Depending on the size of the service request and other variables, the property manager may wish to initiate a request for quote ("RFQ") process in order to obtain the best competitive bid. Under the current ad hoc system, this is often done with via phone calls or through the mail, which is slow and inefficient. Even though at least one Internet-based company, i.e., Onvia.com (http://www.onvia.com/), appears to provide for competitive bidding, the RFQ process is not limited to a pre-selected group of service providers, so time is wasted sorting through undesired or questionable responses, also such systems are not designed for the property management and are not easily adapted by participants.

Given the problematic nature of the current ad hoc system of handling service requests, it would be desirable to provide a system which overcomes these limitations.

SUMMARY OF THE INVENTION

In one embodiment, the present invention mitigates or overcomes the forgoing limitations by providing a network-based system and method for creating, tracking and managing events such as service requests, maintenance reminders and other events associated with managing property.

BRIEF DESCRIPTION OF THE DRAWINGS

A better understanding of the present invention can be obtained when the following detailed description of the preferred embodiments which are considered in conjunction with the following drawings, in which.

DETAILED DESCRIPTION

Figure 1:
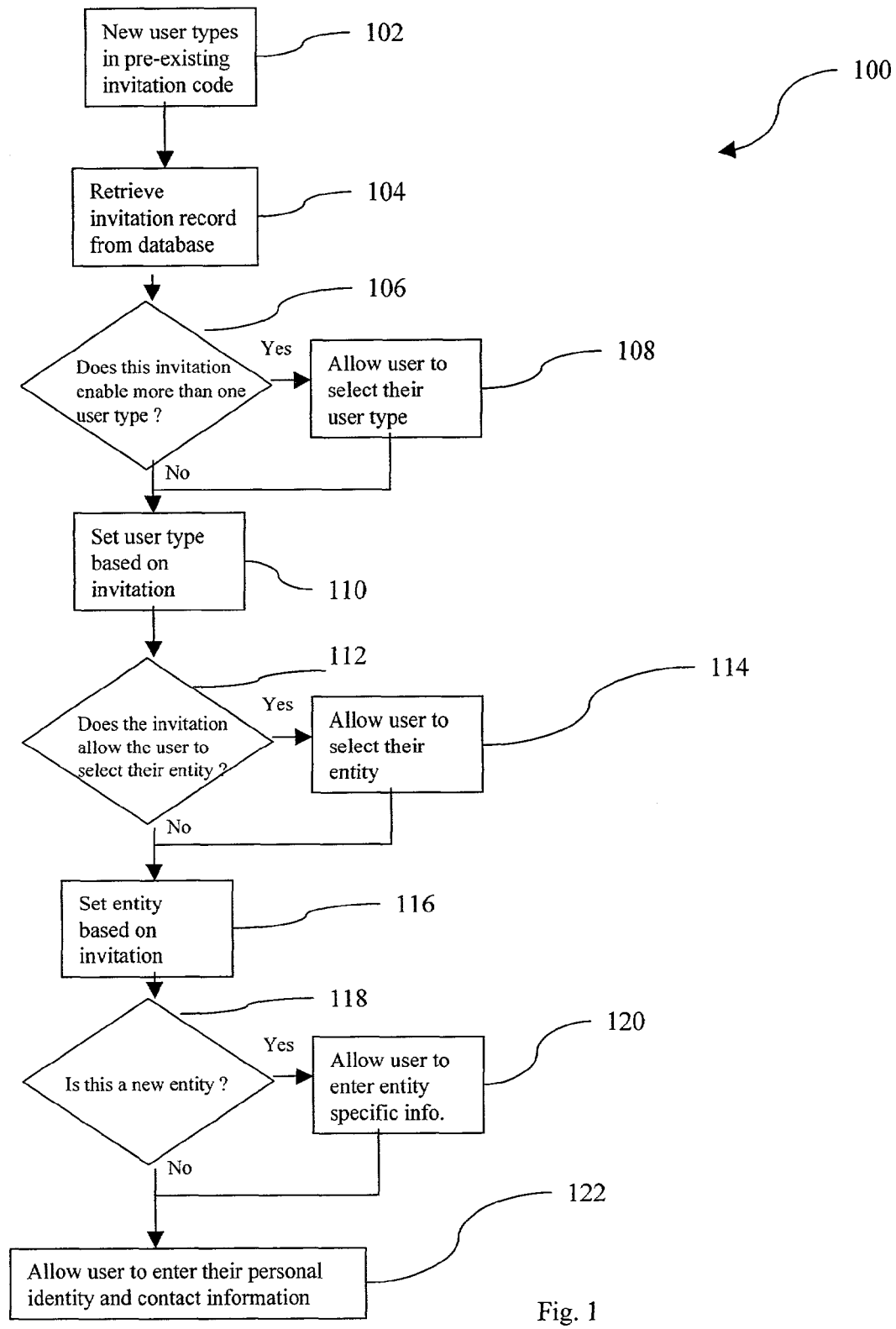
FIG. 1 is a flow chart illustrating a system and process for handling express guided user registration in one embodiment of the present invention.

As described in detail herein, in one embodiment, the present invention mitigates or overcomes all of the forgoing limitations by providing an Internet-accessible property management system for creating and tracking events, also described as "incidents" herein, such as service requests, maintenance reminders and other events associated with managing property. These events are created and tracked regardless of whether they were initiated by a tenant or property manager, although they may be treated differently depending on the levels of authorization permitted to a particular tenant and property manger. Note that the owner administrator is often classified as a property manger with a particular set of attributes. Events such as service requests are stored in a database which in the present invention permits queries from registered users. Registers users are those tenants, property managers, vendors, owner representatives and others which have been issued a system ID and password. In one embodiment, all registered users can access the present invention via the Internet.

As described in detail herein, in one embodiment, the present invention mitigates or overcomes all of the forgoing limitations by providing an Internet-accessible property management system for creating and tracking events, also described as "incidents" herein, such as service requests, maintenance reminders and other events associated with managing property. These events are created and tracked regardless of whether they were initiated by a tenant or property manager, although they may be treated differently depending on the levels of authorization permitted to a particular tenant and property manager. Note that the owner administrator is often classified as a property manger with a particular set of attributes. Events such as service requests are stored in a database, which in the present invention permits queries from registered users. Registered users are those tenants, property managers, vendors, owner representatives and others which have been issued a system ID and password. In one embodiment, all registered users can access the present invention via the Internet.

Once the service request is complete and submitted, the service request is entered into a relational database. All permitted users can now access this information via the Internet for the latest status which is guided and tracked by the present invention as will be described in greater detail below. In one embodiment, depending on the level of urgency and other parameters, at this point the service request can follow one of two paths, i.e., the default path or the fast track path.

Under the default path in one embodiment of the present invention, the property manager, upon logging onto the system, will be shown a hypertext link prompting him/her to initiate a request for quotation ("RFQ") as follows and is described in more detail herein. Depending on the type of service and whether the property manager has identified vendors for this service type, the property manager can select a group of vendors who will be given the opportunity to provide a quote for the required service. If there are no vendors previously identified by the property manager for the type of service required, support is provided for the property manager to identify appropriate service vendors within a certain distance relative to the location requiring service. The property manager has the option to create his/her own service request description, append the tenant's description if desired, or if adequate, merely forward the tenant's description on to a vendor. The property manager can specify limitations on the desired repair timeframe, cost and types of responses the vendor can make. The service history can also be appended. In one embodiment, the service history is drawn from historical data in the database rather than entered manually by the property manager.

After the RFQ is transferred to the one or more vendors as specified by the property manager, those vendors will be notified by one or more of a variety of different methods that their response to the RFQ is requested. In one embodiment all notification methods are driven from the present invention and do not require additional human intervention. Those methods include: web site provided information, e-mail, pager activation, real-time synthesized telephone-delivered voice or voice mail, fax, paper mail, and transmission to a digital wireless device such as a personal digital assistant.

The vendor may become aware of the RFQ by one or more of the above methods and will use their Internet access to review the pending RFQ. A vendor can elect to decline the bid or, if he/she fails to respond at all, in one embodiment a property manager-defined time limit will cause the RFQ to timeout for that vendor. If the vendor wants to respond to the RFQ by submitting a bid, they will utilize the present invention via its web site on the Internet to indicate whether they want a site survey or not before the bid is submitted, supply an estimated cost and dates and times of commencement and completion of service. After entering any additional commentary, the vendor can select the "preview bid" button. A "bid" can take many form, for example, in one form of a bid, the vendor indicates that he/she will service the incident and will either bill later or cover the work under contract or warranty. This is a very simple 'bid' with no cost or time estimate, which may be present in other bids.

Under the fast track path in one embodiment of the present invention, the tenant's service request may be forwarded directly to a vendor if various parameters are met, such as classification on matter, cost and urgency. For instance, a service request regarding a dangerous electrical condition may be forwarded directly to a vendor, as well as notifying the property manager.

Turning to FIG. 1, in one embodiment of the present invention, a system and process for handling express guided user registration 100, is shown. Registration is the process by which the users of the system become known to the system. New users are given an invitation code to access the property management system that links that user to a particular company or set of companies and a type of access, such as tenant, property manager and service vendor. Other access parameters may also be specified. In one embodiment the present invention the access parameters are specified by the property manager or owner administrator who determines each user's access privileges.

This flow chart shows the basic logic of the registration process. The registration process supports the more complex cases where a user selects their user type and company and the more simple cases where the user is restricted to a single company. In the latter case, as shown in FIG. 1, the user interaction with the property management system may skip entering data into the intervening forms.

In step 102 a new user types in the pre-existing invitation code they have received from those associated with the property management system. The property management system retrieves the invitation record from its database in step 104. The property management system queries the invitation record as to whether the invitation enables more than one user type in step 106, if it does, the user is permitted to select their user type, e.g., tenant, property manager, vendor, in step 108, and the processing returns to step 110, if not, the processing moves directly to step 110. Note that in one embodiment steps 106 and 108 are eliminated. In step 110 the property management system sets the user type based on the parameters as specified in the invitation and/or by the user as described herein. In step 112, analogous to step 106, the property management system queries whether the invitation allows the user to select their "entity", e.g., their company, if it does, the user is permitted to select their entity in step 114, and the processing returns to step 116, if not, the processing moves directly to step 116. In step 116 the property management system sets the entity based on the parameters as specified in the invitation and/or by the user as described herein.

The property management system queries its database to determine whether the specified entity is new to the database in step 118. If the entity is a new entity, the user is allowed to enter entity specific information to help complete the information record on that entity in step 120 and the processing returns to step 122, if not, the processing moves directly to step 122. In step 122 the property management system allows the user to enter their personal identity and contact information, thereby completing the express guided user registration process.

Figure 2:
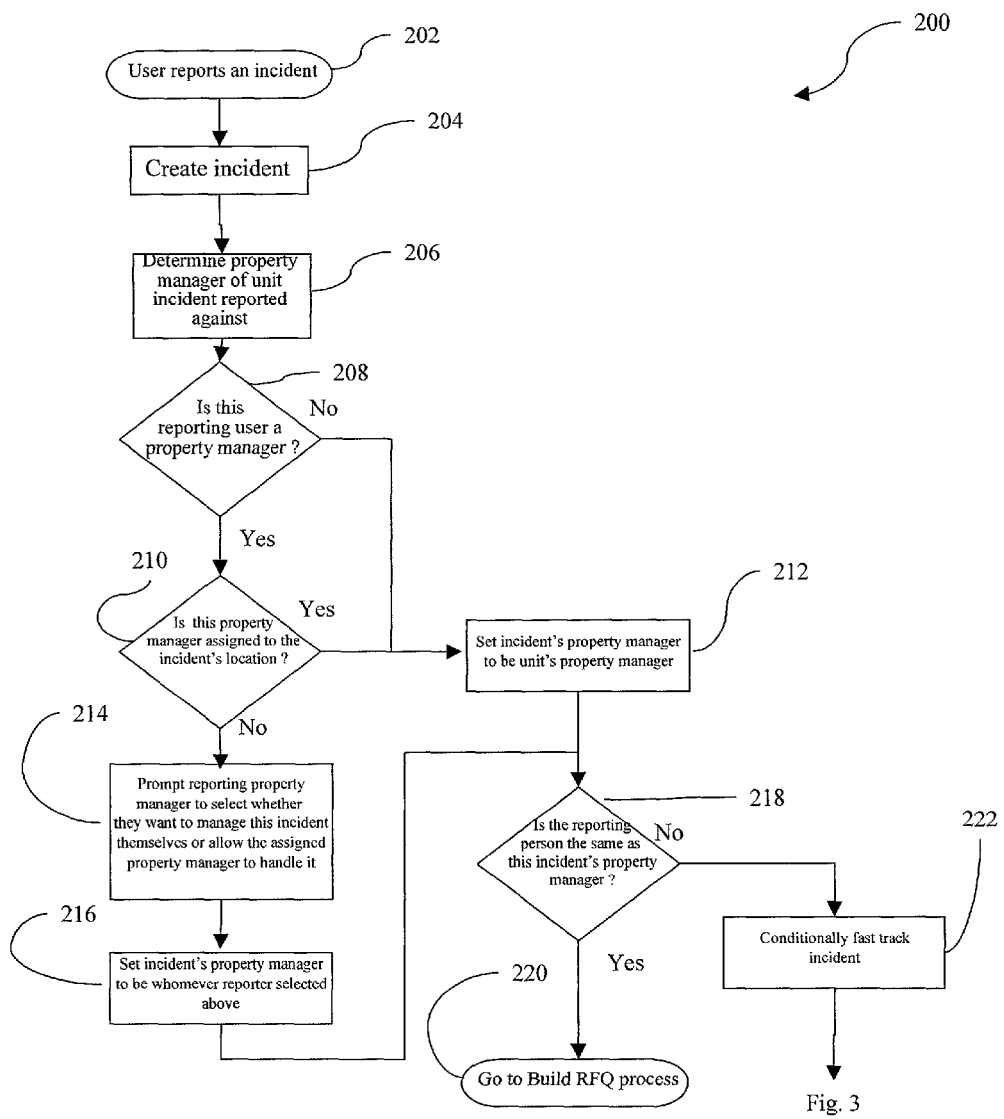
FIG. 2 is a flow chart illustrating a system and process for reporting incidents in one embodiment of the present invention.

Turning to FIG. 2, in one embodiment of the present invention, a system and process for reporting incidents 200, is shown. Reporting incidents or scheduling future incidents, such as in the case of routine maintenance is handled by the property management system. The present invention guides users to create incidents and tracks those incidents to facilitate better property management. FIG. 2 illustrates how incidents are handled when first reported. Depending on parameters associated with the user and location, different paths in FIG. 2 are followed. A property management system user decides to report an incident in step 202. In step 202, the user provides a description of the problem including type and urgency and location. The location is selected first from the locations previously associated with each user. Locations can be defined to varying degrees of specificity. For example, the location may be a particular building or a particular office in that building.

After location, the type of problem or desired service is specified. For example, in one embodiment of the present invention, the types of service requests descriptions associated with an incident include: alarm, electrical, elevator, fire sprinkler, heating, HVAC, Janitorial, Landport (operators of the property management system), landscaping, lighting, locksmith, noise abatement, plumbing, radiation protection, roof, tree trimming, etc. The user can define other services. The user also selects an urgency level associated with the service, which in one embodiment can be either low, medium, high or emergency. The level of urgency is defined to include a response within a particular time corresponding to the level of emergency. The user can also specify a range of preferred times for servicing in response to the incident, for example, 9 a.m. to 5 p.m. Finally, the user is prompted to add their description of the problem to help facilitate clear communications among those involved in this process.

The property management system creates a record in its database to contain this information regarding this incident, in step 204. In step 206, the property management system determines who is the property manager of the location of the reported incident. Step 206 is described in more detail in FIG. 4. In step 208 the property management system compares the identified property manager from step 206 with the user identification for the user creating that incident, if they are the same individual, the processing movers to step 210, if not, the processing moves to step 212. If the reporting user is a property manager, in step 210, the property management system queries whether the reporting property manager is assigned to the incident's location, if the property manager is, then in step 212 the property management system sets the incident's identified property manager to be the identified property manager, otherwise the property management system moves to step 214. In step 214, the property management system prompts the reporting property manager to select whether they want to manage this incident themselves or allow the assigned property manager to be responsible for it. The user has this option if the user is a property manager but not if the user is the manager of the incident's location. In step 216, the property management system set the incident's property manager to be whomever the reporting property manager selected in step 214 and the processing continues to step 218. Step 218 is reached either after steps 212 or 216, as shown in FIG. 2. In step 218, the property management system queries whether the incident reporting user is the same person as the incident's property manager, if so, the property management system moves to step 220 to a request for quote ("RFQ") process described herein, otherwise, the incident is conditionally "fast tracked" and the processing moves to FIG. 3.

Figure 3:
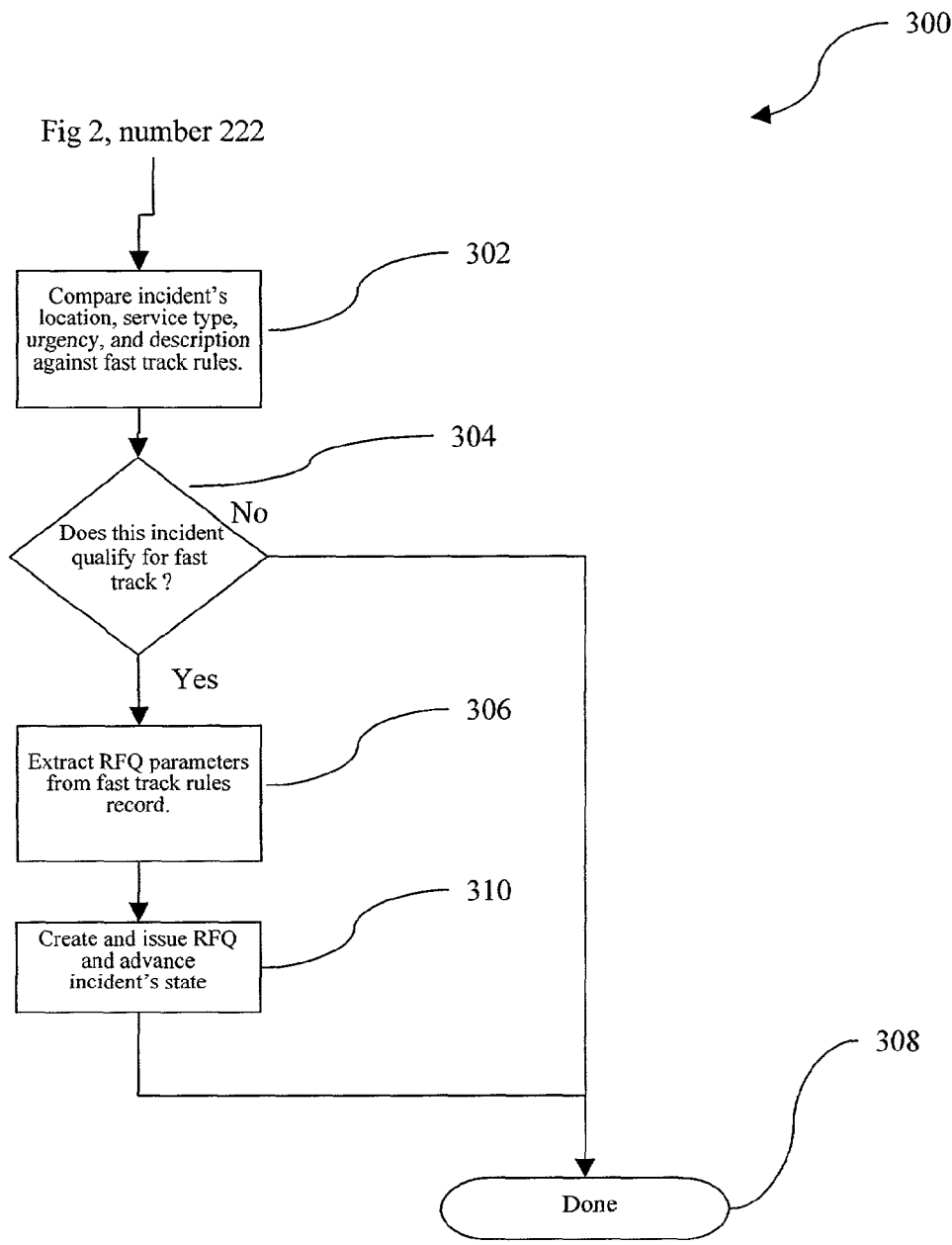
FIG. 3 is a flow chart illustrating a system and process for determining fast track status in one embodiment of the present invention.

Turning to FIG. 3, in one embodiment of the present invention, a system and process for determining fast track status 300, is shown. The fast track designation applies to incidents where a request for service is transmitted directly to a service provider based on a previously defined set of rules. In the fast track determination 300 the conditionally fast tracked incident from step 222 in FIG. 2 is compared in step 302 to a set of rules regarding that incident's location, service type, urgency, description. Even incidents reported by tenants can be fast tracked based on the appropriate rules. In step 304, the property management system queries whether the incident qualifies for fast track status. If the reported incident does qualify because of the underlying nature of the reported problem, then the property management system moves to step 306, otherwise, there is not justification for fast track status and the processing has completed its analysis in step 308. In step 306, the property management system extracts a RFQ parameters from fast track rules record, which the system uses in step 310 to create and issue an RFQ to the appropriate service vendors. The state of the incident is advanced as though the responsible property manager has approved of the RFQ. In one embodiment, the property management system employs a sequential or 'contact one at a time' RFQ strategy when contacting multiple vendors.

Figure 4:
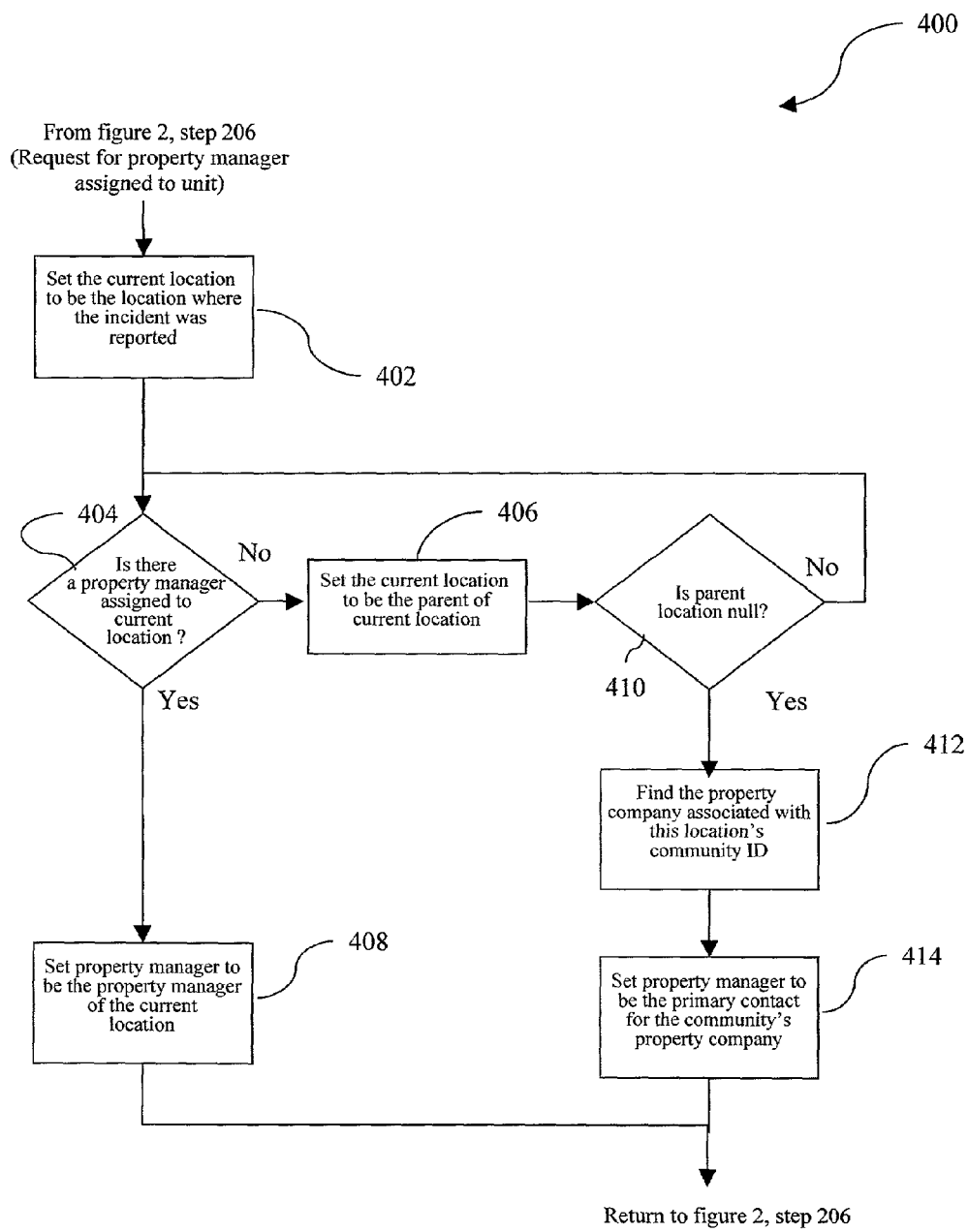
FIG. 4 is a flow chart illustrating a system and process for identifying a property manager for a reported incident in one embodiment of the present invention.

Turning to FIG. 4, in one embodiment of the present invention, a system and process for identifying a property manager for a reported incident 400, is shown. When an incident is reported, unless the reporter is a property manager, the reporter does not explicitly specify the property manager that they intend to manage this request, instead, the property manager is determined by examining the location where the incident was reported and comparing that with the locations that specific property managers have been assigned. In one embodiment only one property manager can be assigned to a particular location. In one embodiment, a request for a property manager determination is made as part of reporting an incident. Refer to step 206 of FIG. 2. This is done in a reverse hierarchical manner, that is to say that the property management system looks for a property manager associated with the reported location of the incident and continues looking a more and more general descriptions of the property and property managers associated with those descriptions until a property manager is identified. If no property manager is identified, a primary contact person for the property management company or property owner is substituted as the property manager. In step 402 the current location is defined to be the location of the reported incident. In step 404 the property management system queries whether there has been a property manager assigned to that location, if not, then 404 the property management system proceeds to step 406, otherwise, it proceeds to step 408.

In step 406 the current location is redefined to be the parent of current location and the processing continues in step 410. In the property management system a hierarchy of property locations can be specified. For example, an office may reside on a certain floor in a certain building in a particular office complex controlled by a particular property management company or owner. In step 410 the property management system queries whether the parent location is null meaning that the top of the location hierarchy has been reached, if so the processing continues with step 412, otherwise, it returns to step 404. The loop comprising steps 404, 406 and 410 is repeated until either an assigned property manager is identified in step 404 or the parent location is null in step 410. In step 404, when a property manager is identified, the property management system proceeds to step 408 and sets the property manager variable for this incident to be the property manager of the current location and the property management system returns to step 206 in FIG. 2. If in step 410 the parent location is null, the property management system proceeds to step 412. In step 412, the property management system locates the property company associated with this location's community ID. The community ID is a unique identified assigned to each location and proceeds to step 414. In step 414, the property management system sets the property management variable for the incident to be the primary contact for the community's property company or owner contact and the property management system returns to step 206 in FIG. 2.

Figure 5:
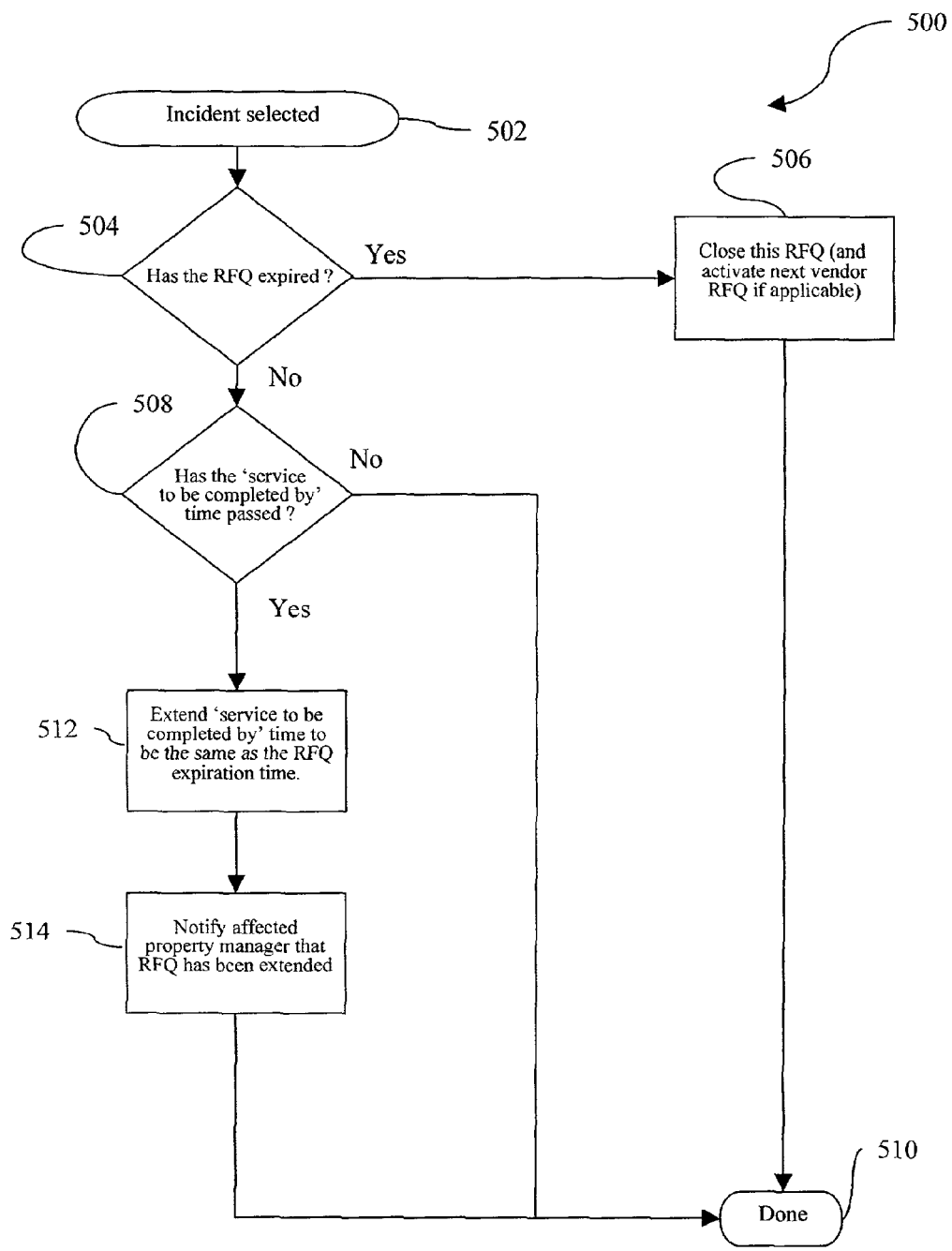
FIG. 5 is a flow chart illustrating a system and process for handling RFQ timing issues such as auto-extend RFQ flow/expiration in one embodiment of the present invention.

Turning to FIG. 5, in one embodiment of the present invention, a system and process for handling RFQ timing issues such as auto-extend RFQ flow/expiration 500, is shown. RFQs may be delivered a single service provider or in parallel or sequential fashion to multiple service providers. RFQs have two expiration times. First, the creator of the RFQ specifies when the job described in the RFQ should be complete. Second, the RFQ itself may expire and in the case of sequential RFQ delivery, then be extended to the next service vendor candidate in the contact list. A special case arises when the "service to be completed by" time passes before the RFQ expires in which case the property management system will auto-extend the "service to be completed by" time to be equal to the RFQ expiration time. This feature can be turned on or off by the user.

If the RFQ process is selected, e.g., in step 220 of FIG. 2, the property management system notes that RFQ was selected in step 502 in FIG. 5, and proceeds to step 504. In step 504, the property management system queries whether the RFQ has expired, if so, the property management system proceeds to step 506, otherwise, it proceeds to step 508. In step 506 the property management system closes the RFQ, and in the case of sequential delivery of RFQs to service vendor candidates, activates the next vendor RFQ until the list of vendors is exhausted in step 510. In step 508 the property management system queries whether the "service to be completed by" time has expired, if not, processing proceeds to step 510 and this process 500 is complete, otherwise the property management system proceeds to step 512. In step 512, the property management system sets the "service to be completed by" time to be the same as the RFQ expiration time and proceeds to step 514. In step 514, the property management system notifies the affected property manager that the RFQ has been extended and the property management system proceeds to step 510.

Figure 6:
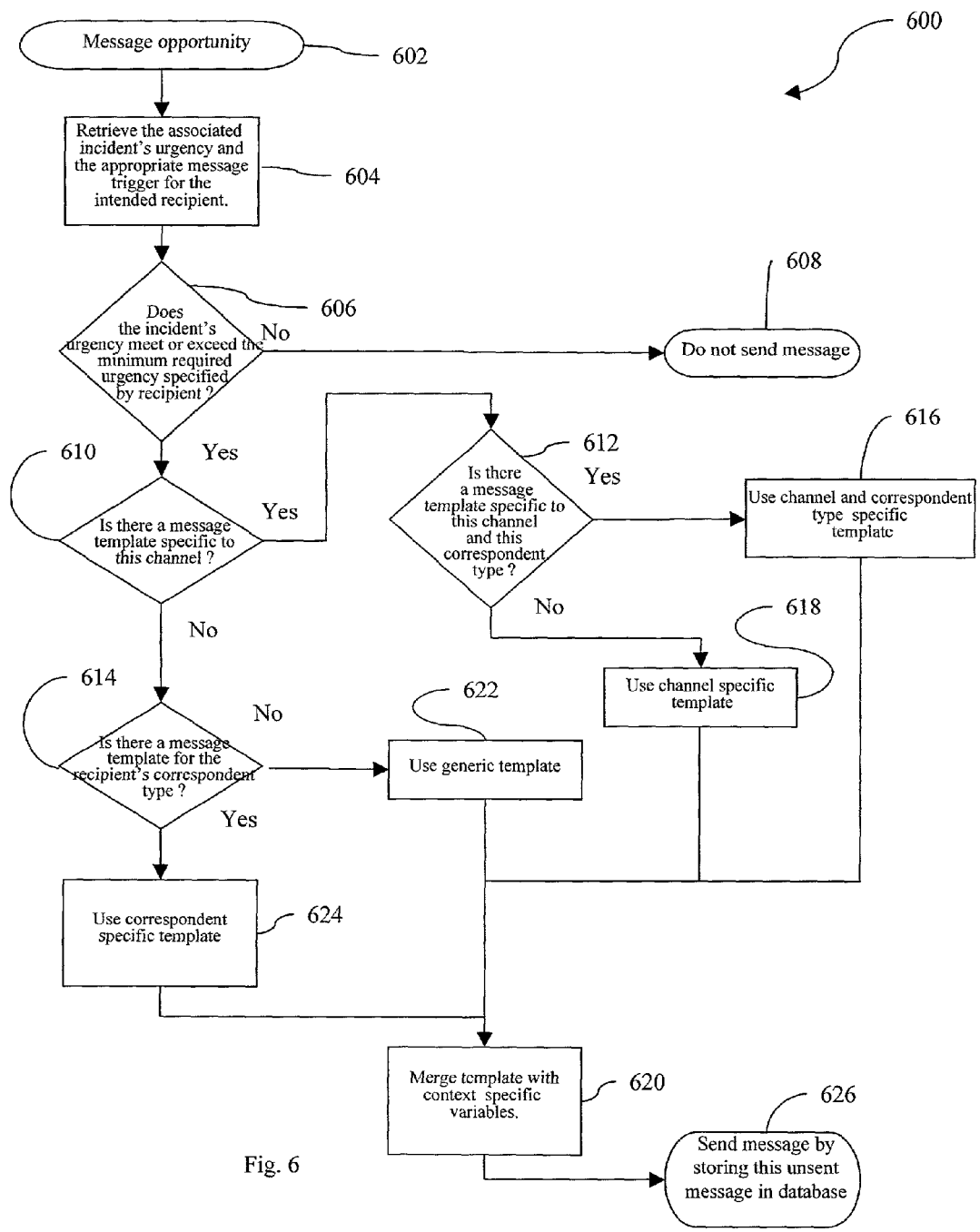
FIG. 6 is a flow chart illustrating a system and process for generating messages in one embodiment of the present invention.

Turning to FIG. 6, in one embodiment of the present invention, a system and process for generating messages 600, is shown. Notification generation is triggered in many parts of the property management system. In one embodiment of the present the users can select how they would like to receive their messages. Depending on the user's attributes and the attributes of the channel or media being selected, different message templates may be selected that are tailored to that user and channel. In step 602 an opportunity to generate a message has been created elsewhere in the property management system. From step 602, the property management system proceeds to step 604 where the property management system accesses its database and retrieves the incident's urgency setting and the appropriate message trigger for the intended recipient, and proceeds to step 606. In one embodiment, urgency is selected from low, medium, high and emergency levels. In step 606, the property management system queries whether the incident urgency level meets or exceeds the minimum required urgency specified by the recipient, if not then no message is sent in step 608 and this system and process 600 is done, if so, the property management system proceeds to step 610.

In step 610 the property management system queries whether there is a message template specific to this particular type of channel, if so, the property management system proceeds to step 612, otherwise, it proceeds to step 614. In one embodiment the channels include transmission via e-mail, facsimile, telephone or voice mail, letter mail, pager messages, wireless data receiving devices such as personal digital assistants (known as "PDAs"), wireless voice receiving devices such as wireless mobile handsets, and other transmissions. Of course the user can always log into the system to see the effects of these actions, that triggered messages, on the status of the incidents displayed on their personal pages, rather than obtain these messages directly. In an alternative embodiment, the user can view these messages directly. Each channel can have more than one template depending on variations within the channel. In one embodiment the correspondent types include users, proxies, or absentee users. In step 612, there was a template specific to the selected channel so the property management system queries whether there is a message template specific to this channel and this correspondent type, if there is, then the property management system proceeds to step 616, otherwise, it proceeds to step 618. In step 616 the template matching the channel and correspondent type is selected and processing proceeds to step 620. In step 618 a channel specific, but not correspondent specific, template is selected for message generation. Back at step 610, if there was not a message template specific to this particular type of channel, the property management system proceeded to step 614. In step 614, the property management system queried whether there is a message template for the recipient's correspondent type, if not, then the property management system proceeds to step 622, otherwise, it proceeds to step 624. In step 622, the property management system selects a generic message template then the property management system proceeds to step 620. In step 624, the property management system selects a correspondent specific template then the property management system proceeds to step 620. In step 620, the property management system merges the template with context-sensitive variables associated with the creation of the message opportunity and the message is transmitted in step 626 to the recipient. In one embodiment the context sensitive variables include the responsible property manager, the date that the work is to be completed by and a description of the problem and/or service believed to be required.

Figure 7:
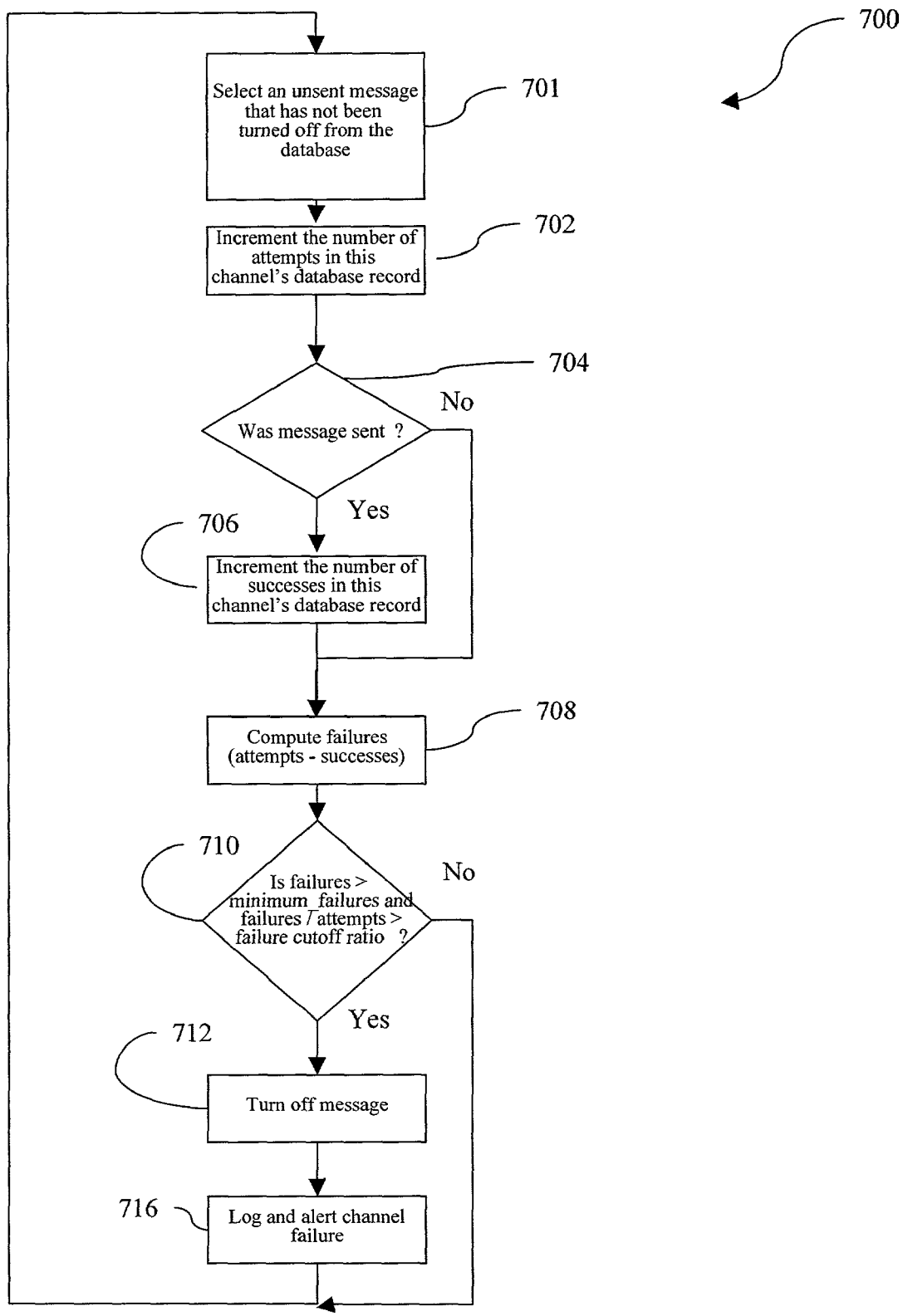
FIG. 7 is a flow chart illustrating a system and process for channel failure detection in one embodiment of the present invention.

Turning to FIG. 7, in one embodiment of the present invention, a system and process for channel failure detection 700, is shown. In one embodiment the property management selects an unsent message that has not been turned off from the database in step 701, then proceeds to step 702. In step 702 the property management system increments a counter tracking the number of attempts to send a message and stores the counter number in a database record corresponding to the channel, then proceeds to step 704. In step 704, the property management system queries whether the message was successfully sent, if so, the processing proceeds to step to step 706, if not, the processing proceeds to step 708. In step 706, the property management system increments the number of successes in the database record corresponding to the channel, then proceeds to step 708. In step 708, the property management system computes the number of failures for that channel by subtracting the number of successes from the number of attempts and proceeds to step 710. In step 710, the property management system queries whether the number of failures is greater than a minimum number of failures and the failure to attempt ratio is greater than the failure cutoff ratio. This ensures that even if the total number of failures is high, the message is not turned off until the failure ratio is also a sufficiently high number. Alternatively, even if the failure ratio is high, the message will not be turned off until the absolute number of failures is also high. This prevents anomalous or spurious circumstances from accidentally triggering steps 712 and 716. In one embodiment, the minimum_failures is ten and the failure cutoff ratio is 50%. If both of these conditions are satisfied the message is turned off in step 712, otherwise, the property management system returns to step 701 and completes a cycle of the channel failure detection 700 process. After the property management system turns off the message in step 712, the property management system proceeds to step 716 where it updates a failure log and creates an alert for the failed channel before proceeding to step 701 and completes a cycle of the channel failure detection 700 process. Both the user and the property management system provider are informed. In one embodiment, the property management system tries to send a message to a 'failed' channel at least once for every new message sent to this channel, thereby giving the failed channel a chance to break out of its failed state by causing the failure ratio to tip back to being acceptable.

Figure 8:
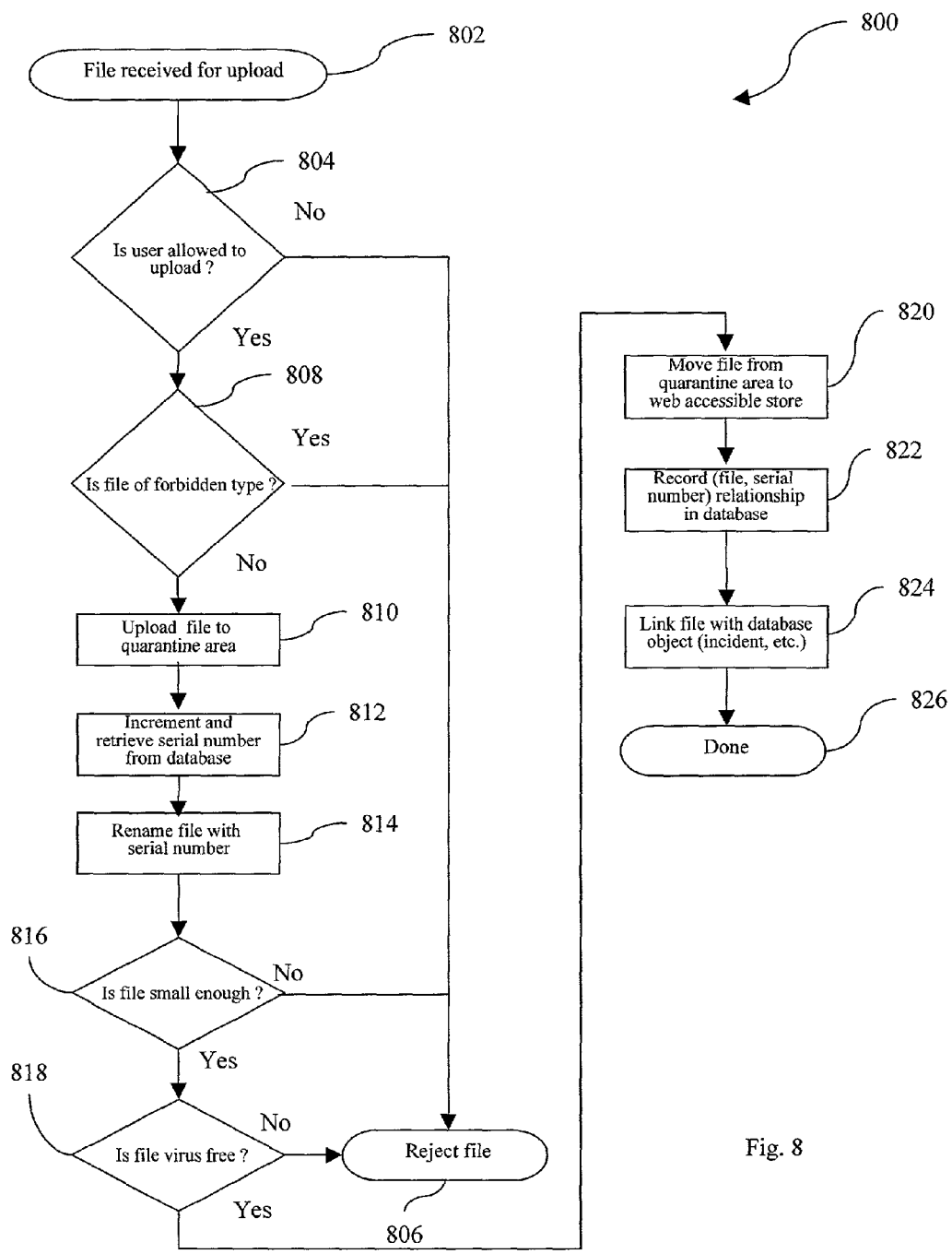
FIG. 8 is a flow chart illustrating a system and process for file upload and quarantine in one embodiment of the present invention.

Turning to FIG. 8, in one embodiment of the present invention, a system and process for file upload and quarantine 800, is shown. In one embodiment the property management system allows users creating incidents logged by the property management system to include files attached to those incidents. Files can also be attached to other database objects too, e.g., locations, bids, RFQs, etc. Such files may contain descriptive text, maps, diagrams, blueprints and other information that the user creating the incident believes may be of use to the service vendor servicing that incident. Although attached files can be useful tools to help obtain the desired service and minimize misunderstandings, uploaded files to the property management system also pose a potential security risk. When a user uploads a file to the property management system it is first checked to make sure it is not an inappropriate type to be stored. For example, executable files such as .exe and .vbs type files are not acceptable for upload to the property management system. The property management system also handles file name collisions between files with the same name to prevent accidental loss of information.

In the system and process for file upload and quarantine 800, a file is received for upload in step 802, then the property management system proceeds to step 804. In step 804, the property management system queries whether the user has permission to upload files, if not, the file is rejected in step 806, otherwise, the property management system proceeds to step 808. Note that the property management system has an initial file size filter built into the web server's configuration that filters out files larger than a particular size relative to the storage available to the server, thereby preventing overloading of the server's memory. In step 808, the property management system queries whether the file is a forbidden type, if it is a forbidden type then the file is rejected in step 806, otherwise, the property management system proceeds to step 810. In step 810, the property management system uploads the file to a quarantine area, then proceeds to step 812. In step 812, the property management system retrieves from its database a serial number and increments that serial number, overwrites the retrieved number in the database, then proceeds to step 814. The generic process of manipulating a database value with storing it locally, e.g., as described in step 812, is known, somewhat counterintuitively, as "increment and retrieve". By way of example, if described properly, an update command in SQL (e.g., update MYTABLE set COUNT=COUNT+1 where ID=5477) in a program running on a computer in California may cause a database running on a computer in Colorado to increment a value, that value is not transmitted to California as a result of that instruction and the work is done locally in Colorado. In step 814, the property management system renames the file with the incremented serial number from step 812 in order to provide a unique identifier to the file, then the property management system proceeds to step 816. In step 816, the property management system queries whether the file is less than the maximum acceptable size, if not, the file is rejected in step 806, if it is, the property management system proceeds to step 818. In step 818, the property management system examines the file for viruses with commercially available software, if any viruses are found, the file is rejected in step 806, otherwise, the property management system proceeds to step 820. In step 820, the property management system moves the file from the quarantine area to Internet-accessible memory storage, then proceeds to step 822. In step 822, the property management system records the original file name/serial number relationship in its database, creating a database record, and proceeds to step 824. In step 824, the property management system links the file with the database object created in step 822 and completes the file upload and quarantine in step 826.

Figure 9:
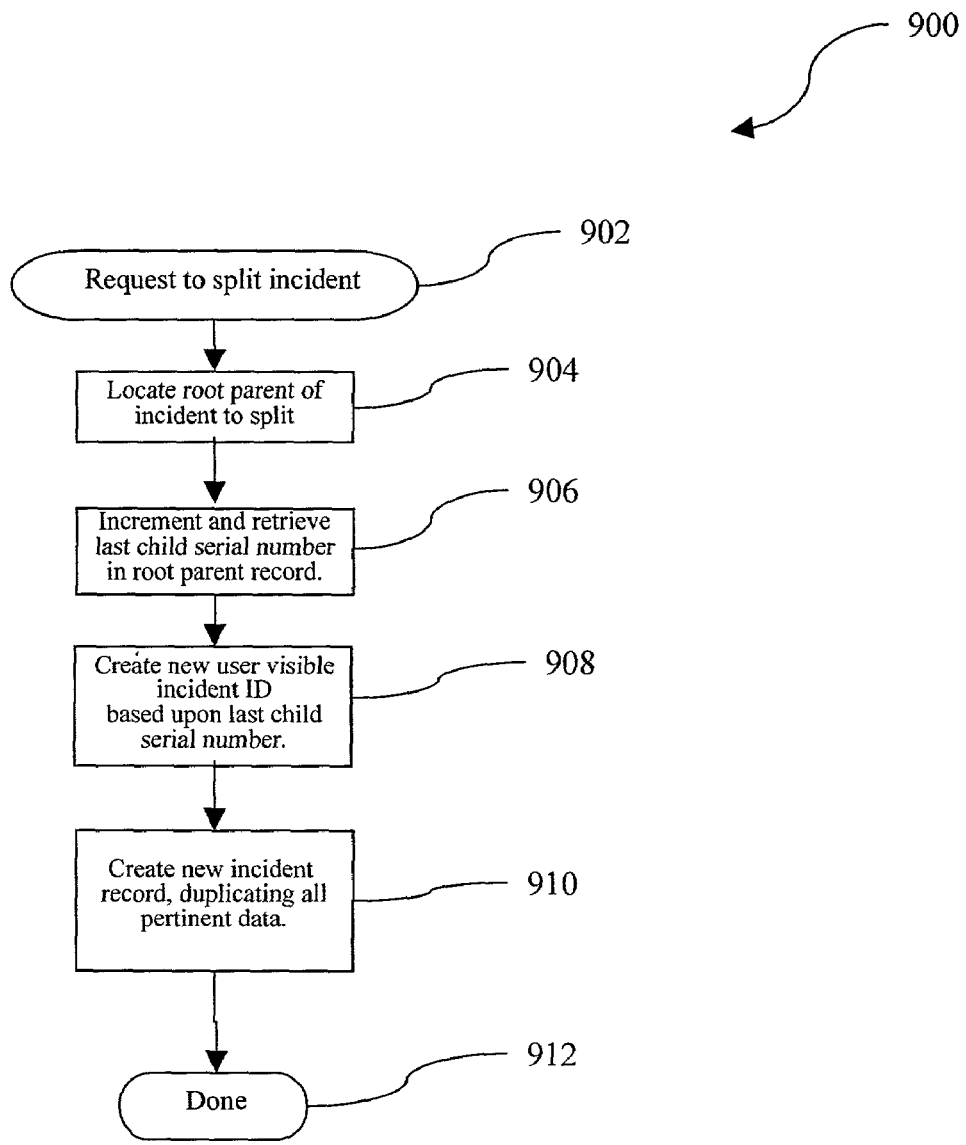
FIG. 9 is a flow chart illustrating a system and process for splitting an incident in one embodiment of the present invention.

Turning to FIG. 9, in one embodiment of the present invention, a system and process for splitting an incident 900, is shown. In some situations a single incident is "split" into two or more parts of a common incident to allow each part to proceed independently. It is useful to split an existing incident when a new vendor replaces or supplements the prior vendor. The new vendor may be a different service class than the prior vendor, e.g., a plumber discovers that he needs help from an electrician to properly service the incident. Another example is where the existing vendor quits or is terminated. This facilitates accurate tracking of both the servicing of the incident and the work record of the vendor. When an incident is split, the pertinent fields from the parent incident are copied over to the new child incident which is placed in the "reported" state. In one embodiment, split incidents have only a single parent, i.e., all split children incidents are attached to the original root parent, regardless of whether the incident to be split is the child of an already split incident. Root parents may have any number of children, but no grandchildren.

In step 902, the property management system receives a request to split an incident and proceeds to step 904. In step 904, the property management system locates the root parent of the incident to split and proceeds to step 906. In step 906, the property management system increments and retrieves the last child serial number in the root parent record, then the property management system proceeds to step 908. In step 910 the property management system creates a new child incident record, duplicating all pertinent data. After step 910, the property management system proceeds to completion in step 912 of the system and process for splitting an incident 912.

Figure 10:
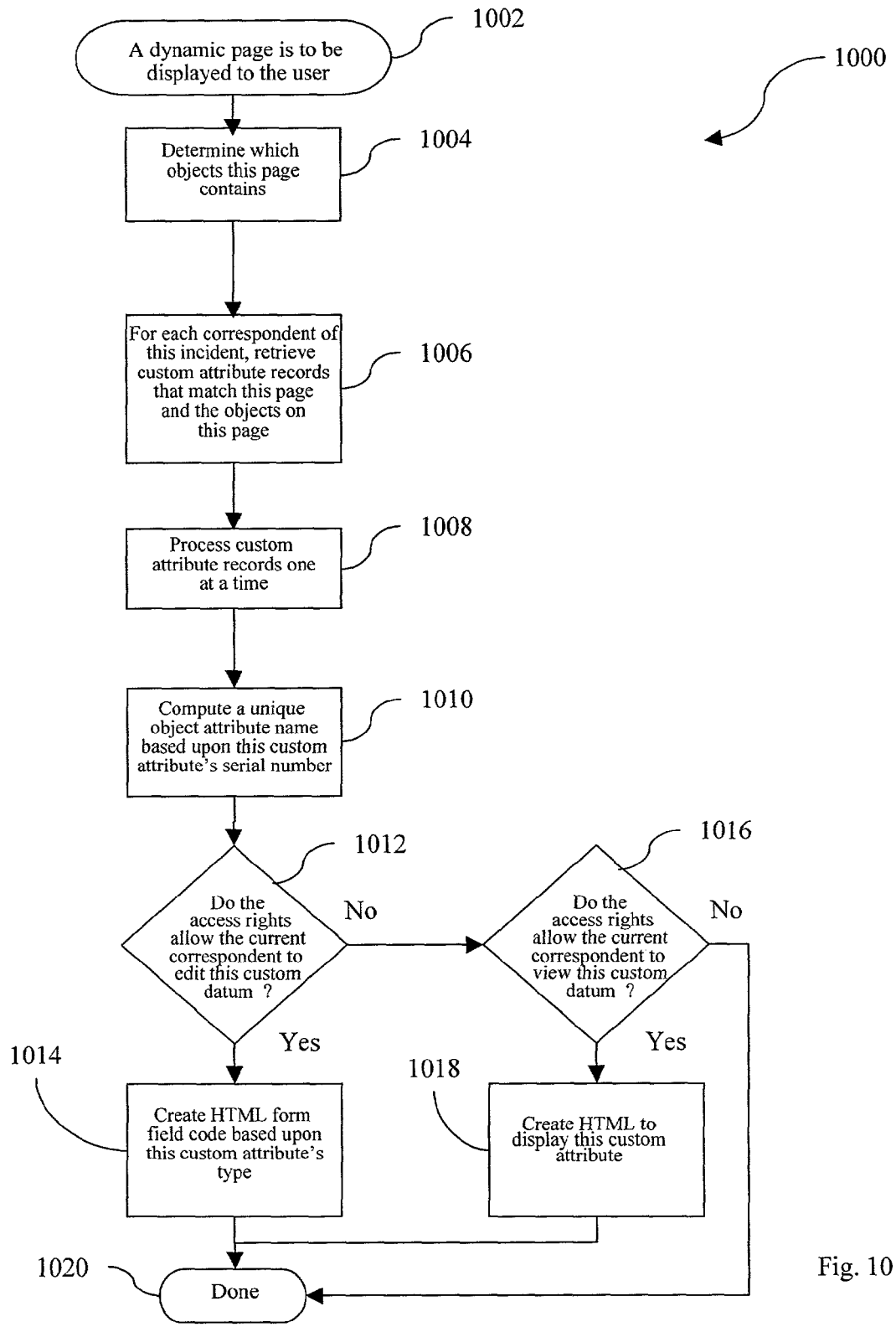
FIG. 10 is a flow chart illustrating a system and process for a system and process for determining whether to display a custom attribute in one embodiment of the present invention.

Turning to FIG. 10, of one embodiment of the present invention, a system and process for determining whether to display a custom attribute 1000 is shown. In some situations a user such as a vendor desires to attach objects such as incidents, bids, areas, etc. to a dynamic page In one embodiment the dynamic page is an hypertext mark-up language (known as "HTML") web page. A data driven technique allows the number, types and associates of customer specific data to be customized for particular users while using a common set of dynamically generated HTML page templates. In one embodiment the common set of dynamically generated HTML page templates are essentially one type of source code files used by the property management system. An advantage to being able to use a common set of source files for all customers, regardless of how their pages are customized is that it greatly reduces the maintenance and overhead costs for supporting special customer needs. In step 1002, the property management system receives a dynamic page to be displayed to the user and proceeds to step 1004. In step 1004, the property management system determines which objects this page is associated with and proceeds to step 1006. In step 1006, the property management system retrieves some attribute records that match this page and the objects on this page for each correspondent of the incident, then the property management system proceeds to step 1008. In step 1008, the property management system processes each custom attribute record sequentially and proceeds to step 1010. In step 1010, the property management system computes a unique object attribute name based upon this custom attribute's serial number and proceeds to step 1012. The custom attribute's serial number is implicitly stored in the object's unique ID field. In one embodiment of the present invention, for example, a unique ID of the custom attribute may be 497, then the property management system translates that into an incident attribute of 'Ipca_497' which can be used to uniquely link back to the original custom attribute #497. In step 1012, the property management system determines whether the access rights allow the current correspondent to edit this custom information, if so the property management system proceeds to step 1014, otherwise, the property management system proceeds to step 1016. In step 1014, the property management system creates an HTML form field code based upon this custom attribute's type and completes the process for determining whether to display a custom attribute 1000 at step 1020 As displayed as a form field, the user receiving the page will be allowed to alter its value. A similar process at the enclosing form's action URL (in HTML, the "<form . . . action='#actionUrl'#>" declaration) will store the user's changed field back in the database. In step 1016, the property management system queries whether the access rights allow the current correspondent to view this custom information, if so, the property management system proceeds to step 1018, otherwise the property management system completes the process 1000 and proceeds to step 1020. In step 1018, the property management system creates uneditable HTML text to display this custom attribute, completes the process 1000 and proceeds to step 1020.

Figure 11:
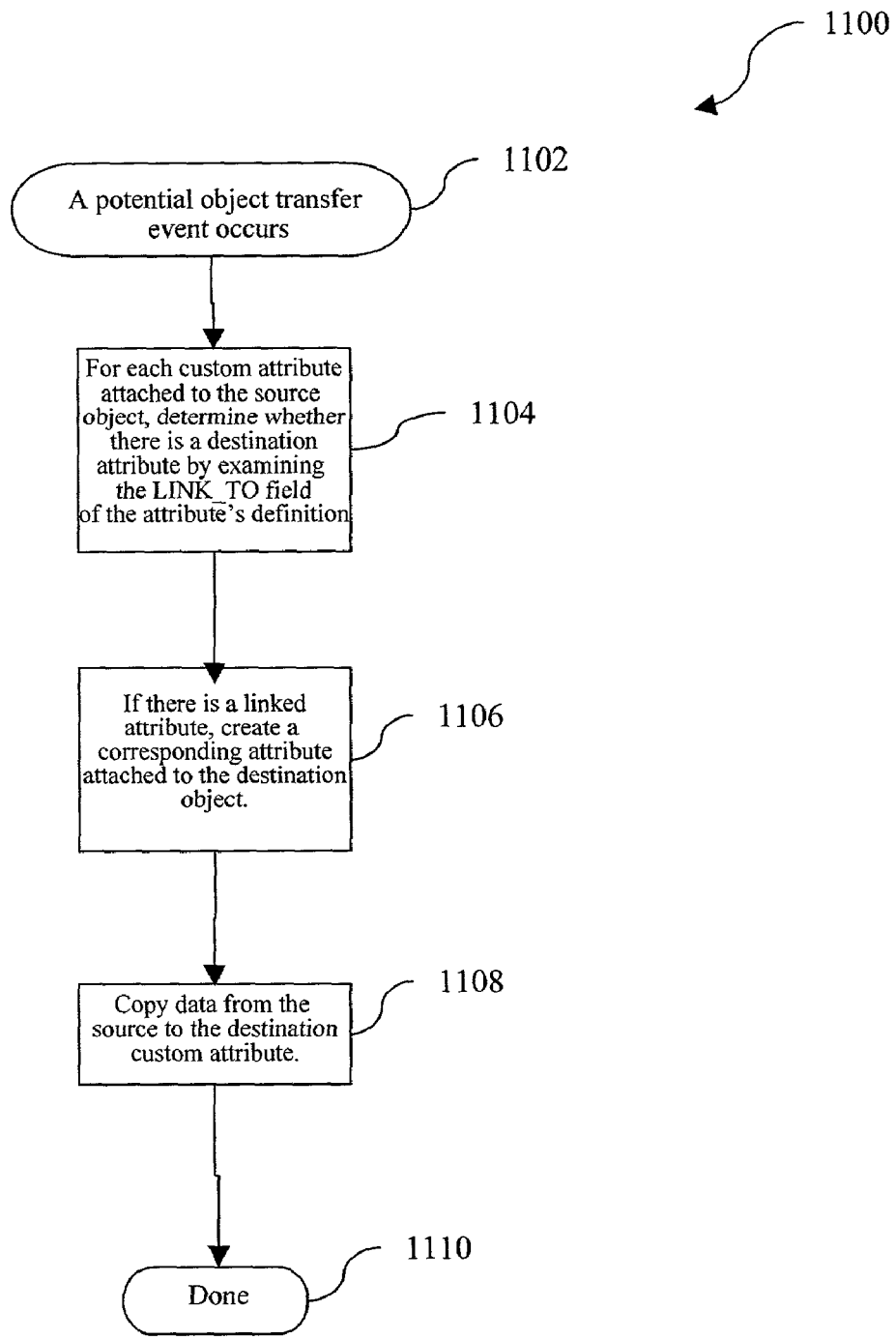
FIG. 11 is a flow chart illustrating a system and process for determining whether to transfer custom attributes from bids to incidents in one embodiment of the present invention.

Turning to FIG. 11, in one embodiment of the present invention, a system and process for determining whether to transfer custom attributes from bids to incidents 1100, is shown. In some situations custom specific data needs to be transferred from object to another as the workflow proceeds. For example, a vendor may attach custom attributes to a bid which should not be transferred to the incident until the bid has been accepted. In step 1102, a potential object transfer event occurs, then the property management system proceeds to step 1104. In step 1104, the property management system, for each custom attribute attached to the source object, determines whether there is a destination attribute by examining a LINK_TO field of the source attribute's definition, then the property management system proceeds to step 1106. The LINK_TO field contains a reference to the unique ID of the destination attribute. In step 1106, if there is a linked attribute, the property management system creates a corresponding attribute attached to the destination object and proceeds to step 1108. In step 1108, the property management system copies data from the source to the destination custom attribute and completes this process 1100 at step 1110.

Figure 12:
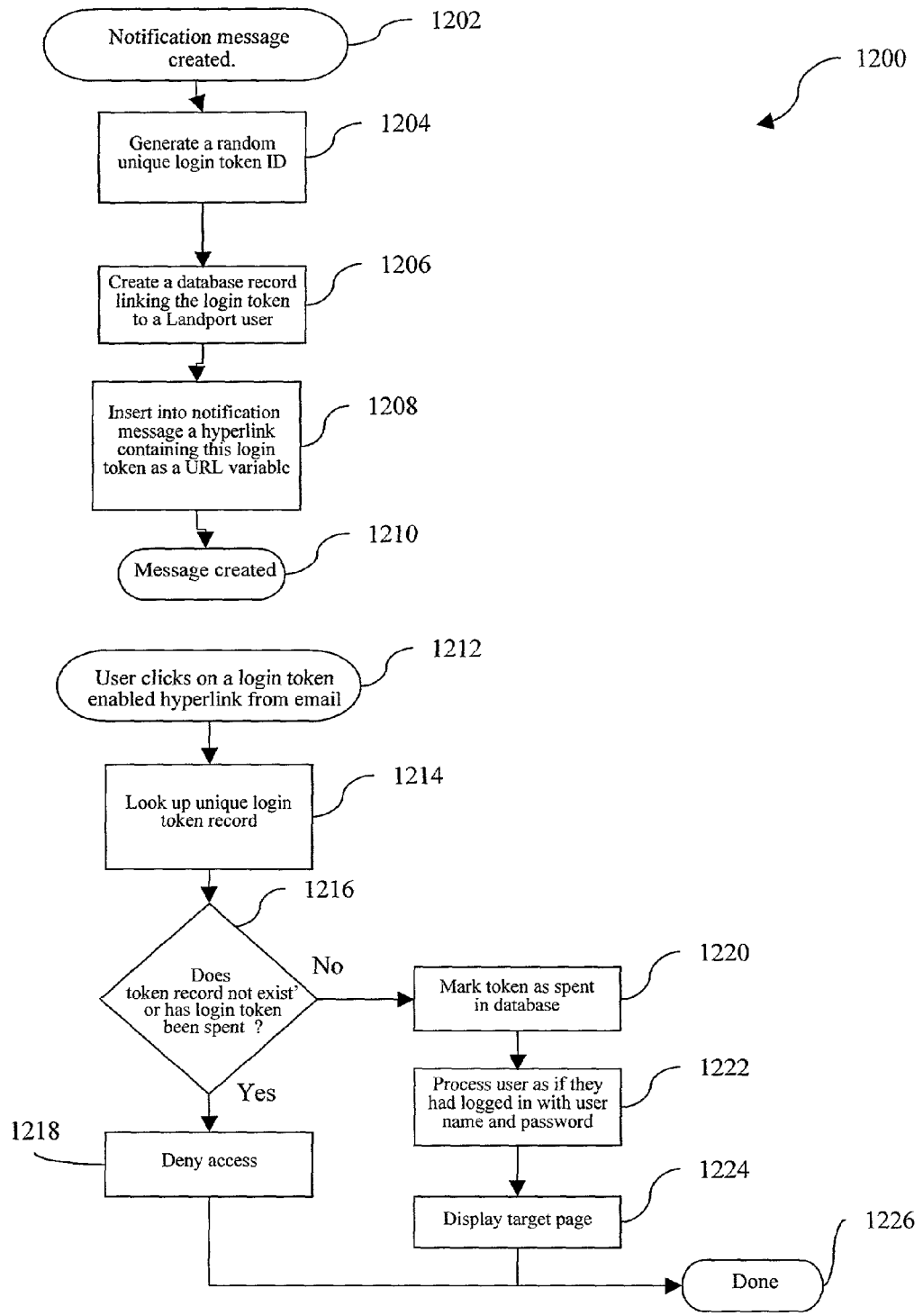
FIG. 12 is a flow chart illustrating a system and process for providing token based logins in one embodiment of the present invention.

Turning to FIG. 12, in one embodiment of the present invention, a system and process for providing token-based logins 1200, is shown. In some situations users may need temporary access to the property management system. This is done through the use of a token-based logon good for one use. The property management system has the ability to sent HTML e-mails as notification messages to users. Those messages may contain links that can take the user directly the web page that the property management system designates for the user to act upon their notification. Because these web pages require users to be logged in, the property management system provides this efficient way for the user to click on a hypertext link to log in. This is solved through the use of temporary login tokens. This is particularly advantageous for users who are relatively unfamiliar with computers, networks and/or the property management system. A token is generated when the notification is sent. After the user clicks on the link and gains access the system the token is 'spent' after a brief time period, e.g., three minutes, in which the user is allowed to initially access the property management system. The user can continue using the property management system after the initial access period but if they disconnect from the system, the token is spent and cannot be used again. This provides a secure way to allow authorized users to bypass the normal login procedure.

In step 1202 the notification message is created and the property management system proceeds to step 1204. In step 1204, the property management system generates a 'random' unique login token ID, e.g., by use of pseudo-random number generator, and proceeds to step 1206. In step 1206, creates a database record linking the login token to a user, then the property management system proceeds to step 1208. In step 1208, the property management system inserts a hypertext link containing the login token as a URL variable into the notification message thereby creating the message for transmission to the user in step 1210.

In step 1212, the user recipient of the notification message e-mail clicks on the their login token-enabled hypertext link, then the property management system proceeds to step 1214. In step 1214, the property management system receives the token and compares it against it's unique login token record, then proceeds to step 1216. In step 1216, the property management system queries whether the login token is nonexistent or has been spent, if so access is denied in step 1218 and the process for providing token-based logins 1200 is complete in step 1226, otherwise, the property management system proceeds to step 1220. In step 1220, the property management system marks the token as spent in its database and proceeds to step 1222. In step 1222, the property management system processes the user's commands and input as if they had logged in with a user name and password linked to the login token, then the property management system proceeds to step 1224. In step 1224, the property management system displays the target page to the user and proceeds to step 1226 which completes the process for providing token-based logins 1200.

Figure 13:
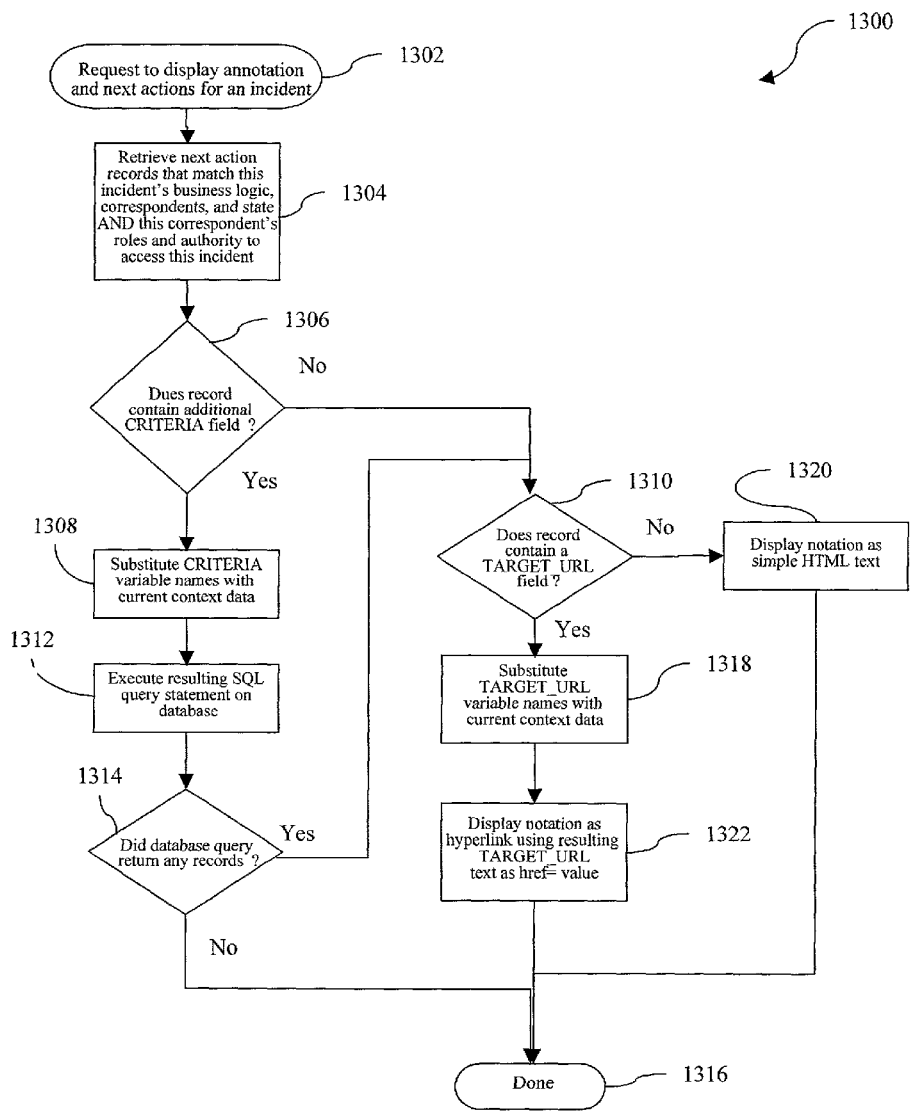
FIG. 13 is a flow chart illustrating a system and process for generating a user 'next action' list in one embodiment of the present invention.

Turning to FIG. 13, in one embodiment of the present invention, a system and process for generating a user 'next action' list 1300, is shown. The property management system contains a powerful and flexible data-driven method for dynamically generating the next action annotation list. The property management system can simultaneously support multiple business logics, i.e., state machines, allowing a single user to manage multiple incidents governed by different business logic. Or each incident the property management system can display a list of annotations tailored t each user's view. Some of the annotation contains hypertext links to actions that the user is allowed to take, given the current system state.

In step 1302, the property management system encounters a request to display annotation and next actions for an incident and proceeds to step 1304. In one embodiment, the 'request' is actually like a subroutine call made from the dynamically generated page template. This call is hard coded into the template source code and may triggered when a user causes that particular web page to be loaded (usually by taking some other action in the web site. In step 1304, the property management system retrieves next action records that match the current incident's business logic, correspondents, state, and this correspondent's roles and authority to access this incident, then the property management system proceeds to step 1306. In step 1306, the property management system queries whether a record contains addition criteria fields, if there are additional 'criteria' then the property management system proceeds to step 1308, if not, it proceeds to step 1310. In one embodiment the 'criteria' field is essentially a catch all for applying any number of requirements that would further limit this next action from being displayed to the user. Since it is interpreted as SQL code, there are lots of additional cases that can be covered that are not covered by the basic next action filtering criteria of incident state, correspondent's roles and authority, etc. For example one piece of text that can appear on the user's next action display is 'previous bid was rejected' This is displayed to vendors looking at an incident with an open service request for which they have already placed a bid that was rejected. For example, in one embodiment the CRITERIA query may include 'select ID from BIDS where INCIDENT_ID=#this_incident# and OWNER_ENTITY=#my_entity# and STATE=rejected' If that SQL query yields one or more records, then there exist rejected bids for this incident and the 'previous bid was rejected' statement would be displayed to the vendor informing that if they rebid, they will have to do better, In step 1308, the property management system substitutes the criteria variable names with current context data and proceeds to step 1312. In step 1312, the property management system executes a resulting SQL query statement on its database and proceeds to step 1314. In step 1314, the property management system queries whether the database query returned any records, if not, the property management system proceeds to complete the process for generating a user 'next action' list 1300 in step 1316, although nothing additional is displayed to the user's page in this case), otherwise, the property management system proceeds to step 1310. In step 1310, the property management system queries whether the retrieved record contains a target uniform resource locator, known as a "URL", if it does, the property management system proceeds to step 1318, otherwise, it proceeds to step 1320. In step 1320, the property management system displays the retrieved display notation as HTML text and proceeds to complete the process for generating a user 'next action' list 1300 in step 1316. In step 1318, the property management system substitutes the TARGET_URL variable names with current context data and proceeds to step 1322. In step 1322, the property management system displays notation as a hyperlink using the TARGET_URL variable text as href equals value, then the property management system proceeds to complete the process for generating a user 'next action' list 1300 in step 1316.

In one embodiment of the present invention the process of merging the context data with the TARGET_URL text stored in the next action database record 1300 is done with a string substitution. For example, suppose the TARGET_URL field is 'pm_review_bid.Ipa?inc_id=#Attributes.inc_id#'. The property management system substitutes the variables (surrounded by ##) with the current context data. For example, if the property management system is processing incident 398, that would result in a target URL of 'pm_review bid.Ipa?inc_id=398'. Then the property management system generates HTML text to be displayed to the user as a hypertext link. In this example, that would turn out to be '<a href="pm_review_bid.Ipa?inc_id=398">Review new bids</a>' which would be directly inserted into the user's HTML page.

Figure 14:
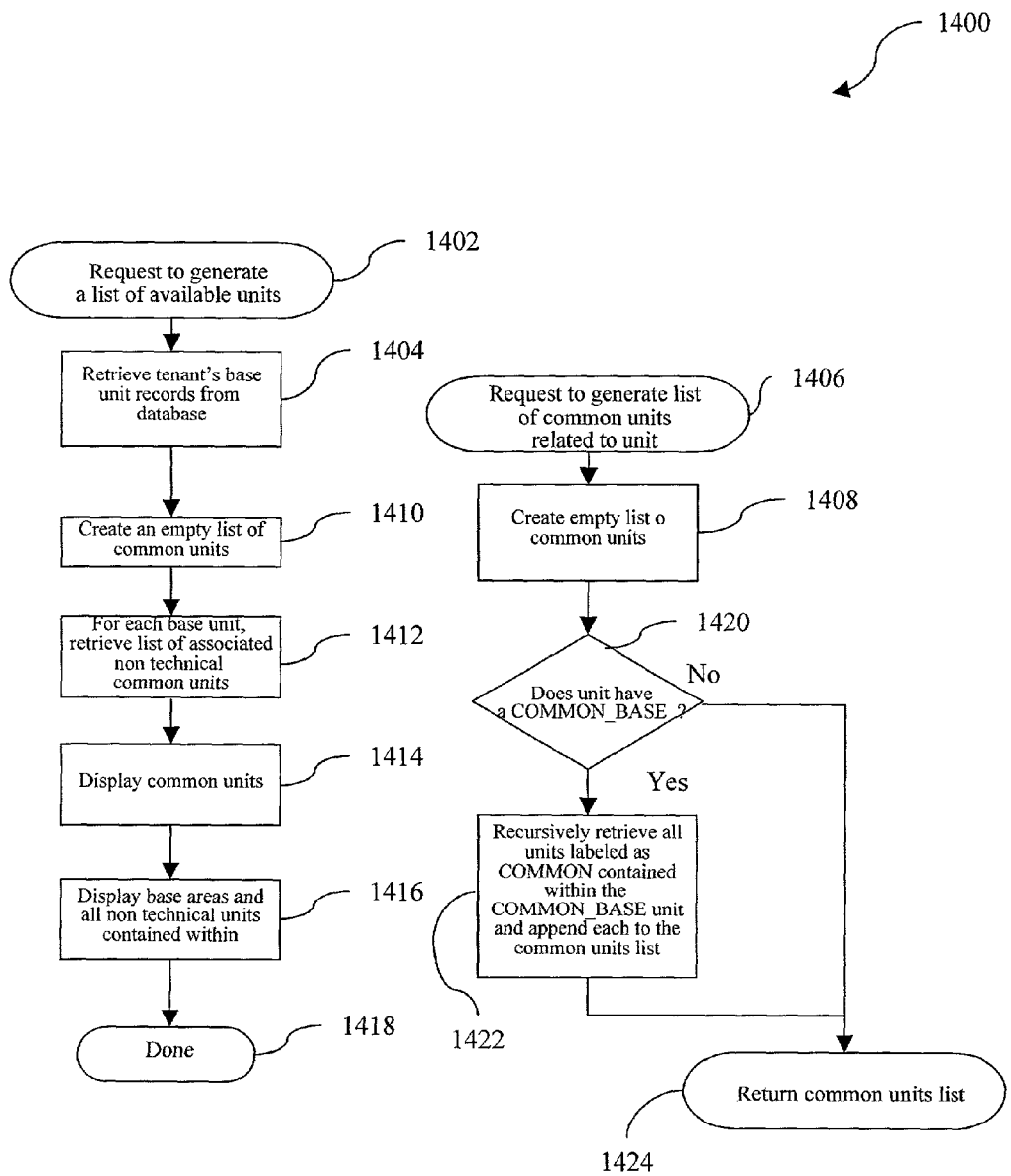
FIG. 14 is a flow chart illustrating a system and process for determining a list of locations to display to a tenant in one embodiment of the present invention.

Turning to FIG. 14, in one embodiment of the present invention, a system and process for determining a list of locations to display to a tenant 1400, is shown. The property management system determines a list of locations to display to a tenant for selection to provide the flexibility to allow a tenant to not only be able to report incidents against the areas that they lease, for example, but also to common areas, e.g., parking lots, elevators, etc., that the tenant may share with others. In one embodiment, by default, tenants are also shielded from seeing areas that are of a technical nature, even if they are within their leased areas.

In step 1402, the property management system encounters a request generate a list of available units and proceeds to step 1404. Corresponding to step 1402, in step 1406, the property management system encounters a request to generate a list of common units related to a particular unit and proceeds to step 1408. Returning to step 1404, the property management system retrieves the tenant's base unit records from its database and proceeds to step 1410. In step 1410, the property management system crates an empty list of common units and proceeds to step 1412. In step 1412, the property management system, for each base unit, retrieves a list of associated non-technical common units, then proceeds to step 1414. In step 1416, the property management system displays base areas and all non-technical units contained within and completes the process for determining a list of locations to display to a tenant 1400 for available units in step 1418. Returning to step 1408, the property management system creates a empty list of common units and proceeds to step 1420. In step 1420, the property management system queries whether the base unit has a COMMON_BASE, i.e., has common areas associated with the base unit, if so, the property management system proceeds to step 1422, otherwise, the property management system proceeds to step 1424 and completes the process for determining a list of locations to display to a tenant 1400 for common units. In step 1422, the property management system recursively retrieves all unit entries labeled as COMMON contained within the COMMON_BASE unit and appends each to the common units list, then the property management system proceeds to step 1424 and completes the process for determining a list of locations to display to a tenant 1400 for common units.

Figure 15:
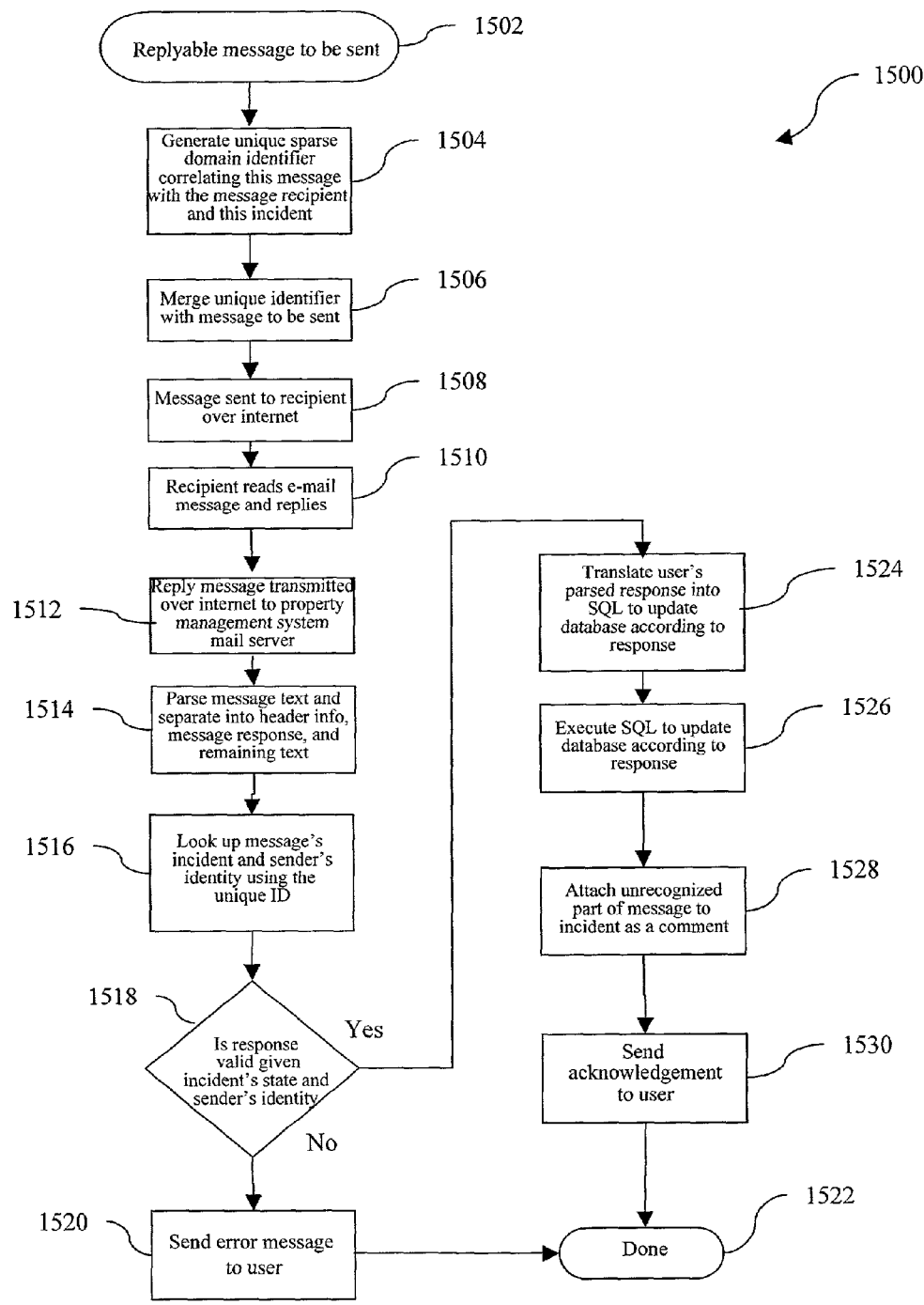
FIG. 15 is a flow chart illustrating a system and process for e-mail based two-way messaging in one embodiment of the present invention.

Turning to FIG. 15, in one embodiment of the present invention, a system and process for e-mail based two-way messaging 1500, is shown. One of the ways to communicate with the property management system is by e-mail. The property management system receives e-mailed responses to property management system-generated messages and processes those replies as if they had been entered directly in the web site maintained by the property management system. A unique sparse domain identifier is used to bind the replied message to the original data in the property management system database. A sparse domain identifier is one in which the full range of possible identifiers is large, but on a small percentage are actually used, for example, less than 0.001% or so. This feature works to thwart forged messages sent by hackers guessing random unique IDs. In one embodiment credit card numbers are selected from a similar sparse domain.

In step 1502, the property management system generates a message to be sent to a recipient wherein the message can be replied to by the recipient, then the property management system proceeds to step 1504. In step 1504, the property management system generates a unique sparse domain identifier correlating the message generated in the prior step 1502 with the message recipient and an associated incident and store it in the database in a record linked to the message, recipient and incident, then proceeds to step 1506. In step 1506, the property management system merges the identifier with the message to be sent and proceeds to step 1508. In step 1508, the property management system transmits the message to the recipient and proceeds to step 1510. In one embodiment the message is transmitted over the Internet. In another embodiment a network other than the Internet is used. In step 1510 the recipient receives and reads the e-mail message and replies to it, the property management system proceeds to step 1512. In step 1512, the reply message is transmitted to an e-mail server associated with the property management system, then the property management system proceeds to step 1514. In one embodiment the message is transmitted over the Internet. In another embodiment a network other than the Internet is used. In step 1514, the property management system parses the received message text into separate header information, message response and remaining text components and proceeds to step 1516. In step 1516, the property management system looks up the previously stored record generated in step 1504 in the database and the message's incident and senders identity information using the unique identification and proceeds to step 1518. In step 1518, the property management system queries whether the response is valid in view of the associated incident's state and the responding sender's identity, if not, then an error message is transmitted to the sender in step 1520 and the process for email based two-way messaging 1500 is complete in step 1522, otherwise, the property management system proceeds to step 1524. In step 1524, the property management system translates the user's parsed response into SQL to update its database according to the response, then proceeds to step 1528. In step 1528, the property management system attaches any unrecognized part of the message to the incident as a comment to ensure that the information is not lost and proceeds to step 1530. In step 1530, the property management system transmits an acknowledgement to the responding user and the process for e-mail based two-way messaging 1500 is complete in step 1522.

Figure 16:
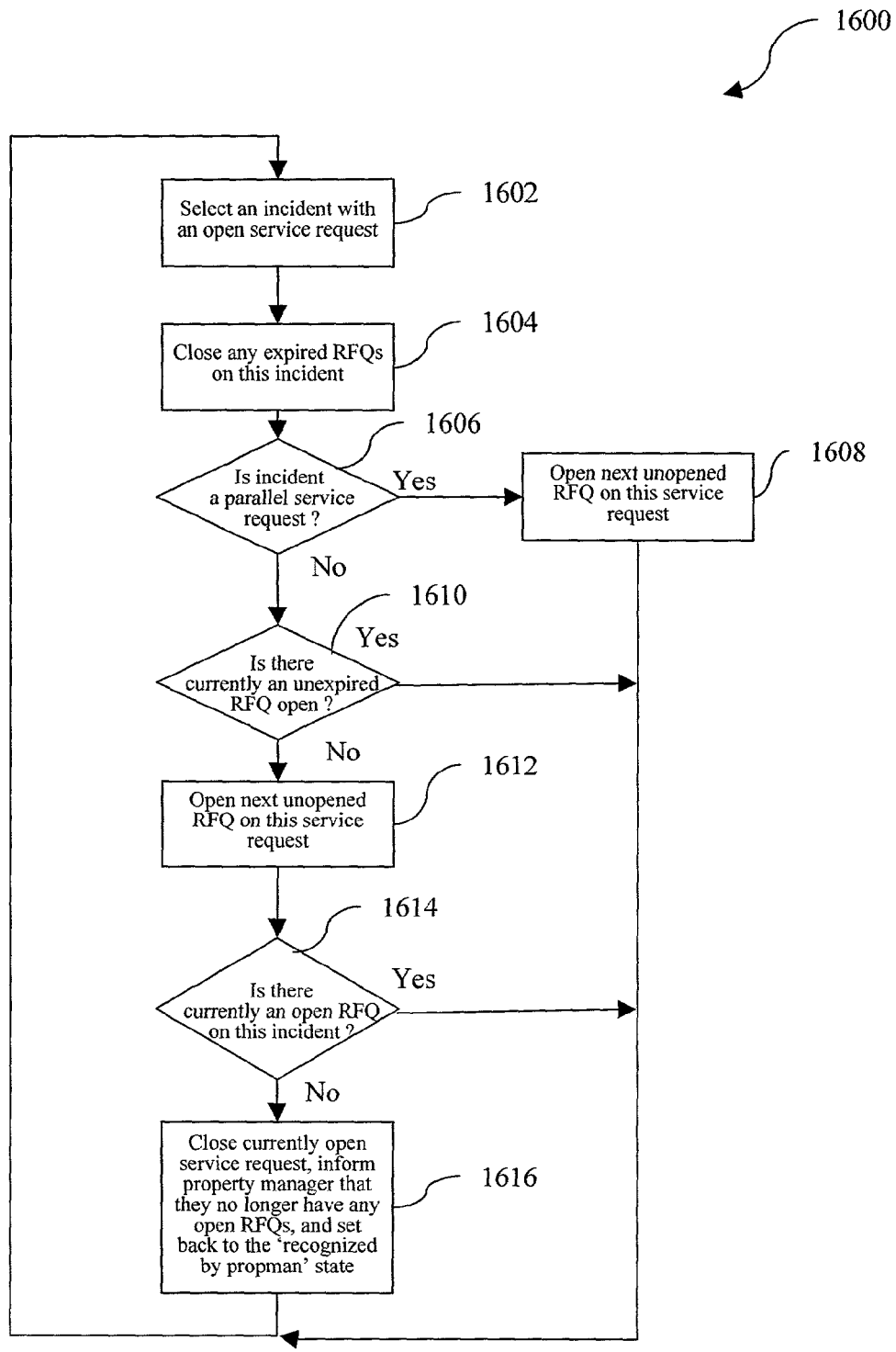
FIG. 16 is a flow chart illustrating a system and process for a system and process for forwarding RFQs to vendors in one embodiment of the present invention.

Turning to FIG. 16, in one embodiment of the present invention, a system and process for forwarding RFQs to vendors 1600, is shown. In association with the creation of incidents, the property management system generates RFQs for vendors to service those incidents. The RFQ process allows a property manager to offer the work associated with incidents on terms acceptable to the property manager, to one or more service vendors. The RFQ process has the advantage of potentially reducing costs for the work to be performed due to competitive pressures and can prevent misunderstandings over the nature, location and timing for the work to be performed. In the situation where the property manager creates an RFQ, it is forwarded to one or more vendors selected by that property manager. In the case of sequential RFQs attached to an incident, only one at a time is opened to the vendors. In sequential or serial RFQs each vendor gets a time-limited period in which they can react to the RFQ by agreeing to it's terms or submitting a bid. For example, the first sequential or serial RFQ may be opened essentially immediately, ignoring any network and other minor delays, while the serial RFQ is available to the second vendor after the first RFQ is closed either by vendor refusal, the property manager rejecting that vendor's bid or expiration of the RFQ before the vendor responds. In the case of parallel RFQs, as opposed to serial RFQs, all vendors are free to respond in parallel. In one embodiment the RFQ process 1600 operates in an infinite loop fashion.

In step 1602, the property management system cycles through and selects an incident with an open service request, then proceeds to step 1604. In step 1604, the property management system closes any expired RFQs on this incident and proceeds to step 1606. In step 1606, the property management system queries whether the incident being reviewed is a parallel service request, if so, the property management system proceeds to step 1608, if not, the property management system proceeds to step 1610. In step 1608, in parallel fashion, the property management system opens the next unopened RFQ on this service request and returns to step 1602, completing a cycle of the process for forwarding RFQs to vendors 1600. Returning to step 1610, given that the incident has been determined to be a serial and not a parallel service request, the property management system queries whether there is currently an unexpired RFQ open, if so, the property management system returns to step 1602, completing a cycle of the process for forwarding RFQs to vendors 1600, if not, the property management system proceeds to step 1612. In step 1612, the property management system opens the next unopened RFQ on this service request and proceeds to step 1614. In step 1614, the property management system queries whether there is currently an open RFQ on the incident it is examining, if so, the property management system returns to step 1602, completing a cycle of the process for forwarding RFQs to vendors 1600, if not, the property management system proceeds to step 1616. In step 1616, the property management system closes the currently open service request, notifies the property manager that the property manager no longer has any open RFQs on this service request, and returns to a state called, 'recognized by propman' in FIG. 17, and finally returns to step 1602, completing a cycle of the process for forwarding RFQs to vendors 1600. In step 1616, the 'recognized by propman' state signifies the fact that the 'propman', i.e., the property manager, has already recognized the incident and whether or not it is billable to the tenant associated with the incident and thus the property management system no longer needs to query the property manager regarding who the servicing of the incident is billable to.

Figure 17:
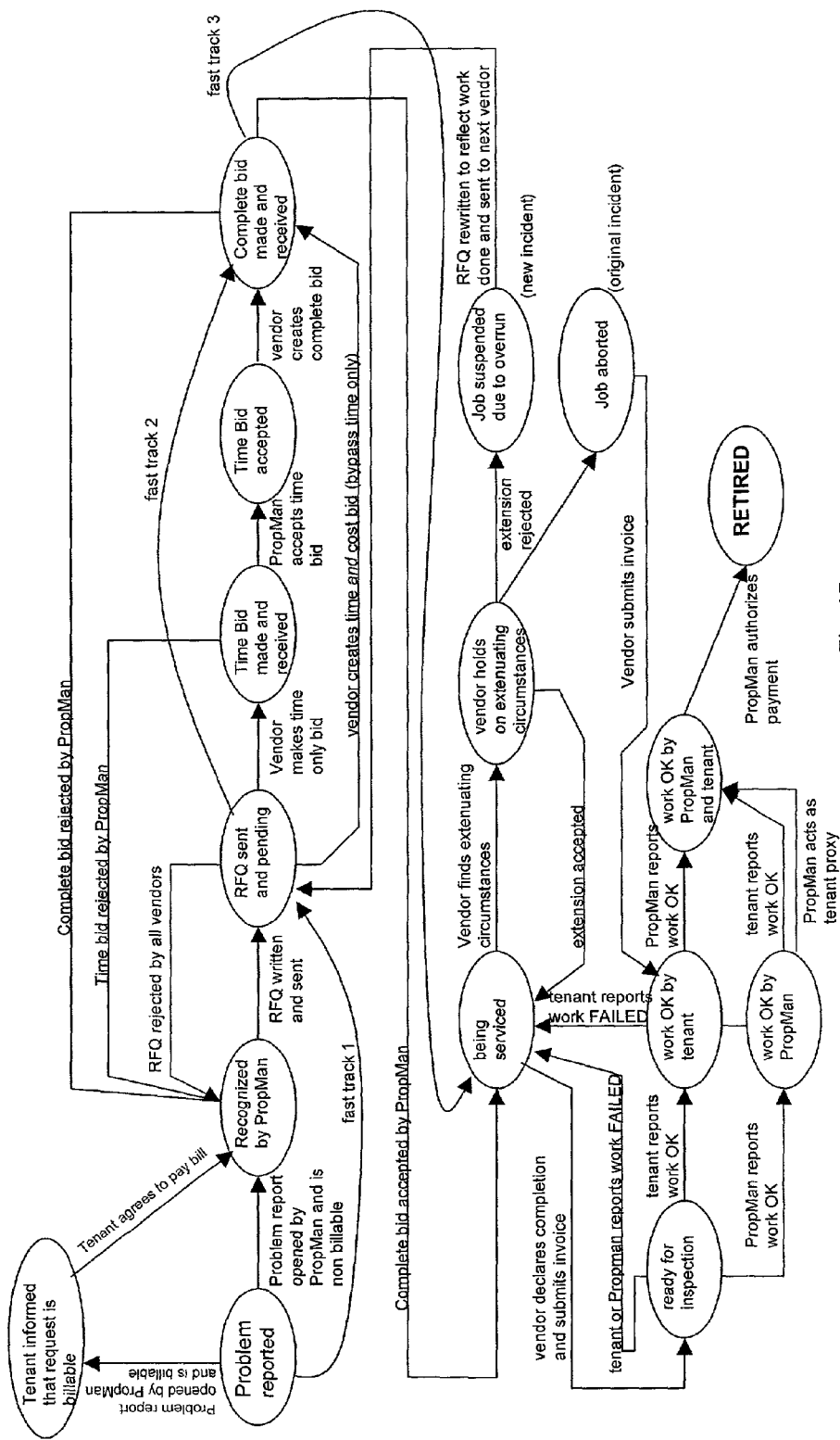
FIG. 17 is a state diagram illustrating workflow in one embodiment of the present invention.

Turning to FIG. 17, in one embodiment of the present invention, a state diagram illustrating workflow 1700, is shown. A state machine governs the property management system's business logic. Each oval represents a state in which an incident can exist. The lines connecting the ovals are actions and conditions that trigger the transition from one state to another. In one embodiment, when a new incident is created, it is placed in the 'problem reported' state. From there the property manager can open a service request and forward that request to vendors. Vendors bid or accept the service request and property managers may accept those bids, causing the incident to enter into a 'being serviced' state. When the vendor completes the task, they declare that they are done, causing the incident to transition to the 'ready for inspection' state. Then a combination of the property manager and original reporter of the incident approve of its completion to cause the incident to be closed and retired. The state of an incident governs what actions may be taken by which parties and hence affects the user's web pages as displayed.

Figure 18:
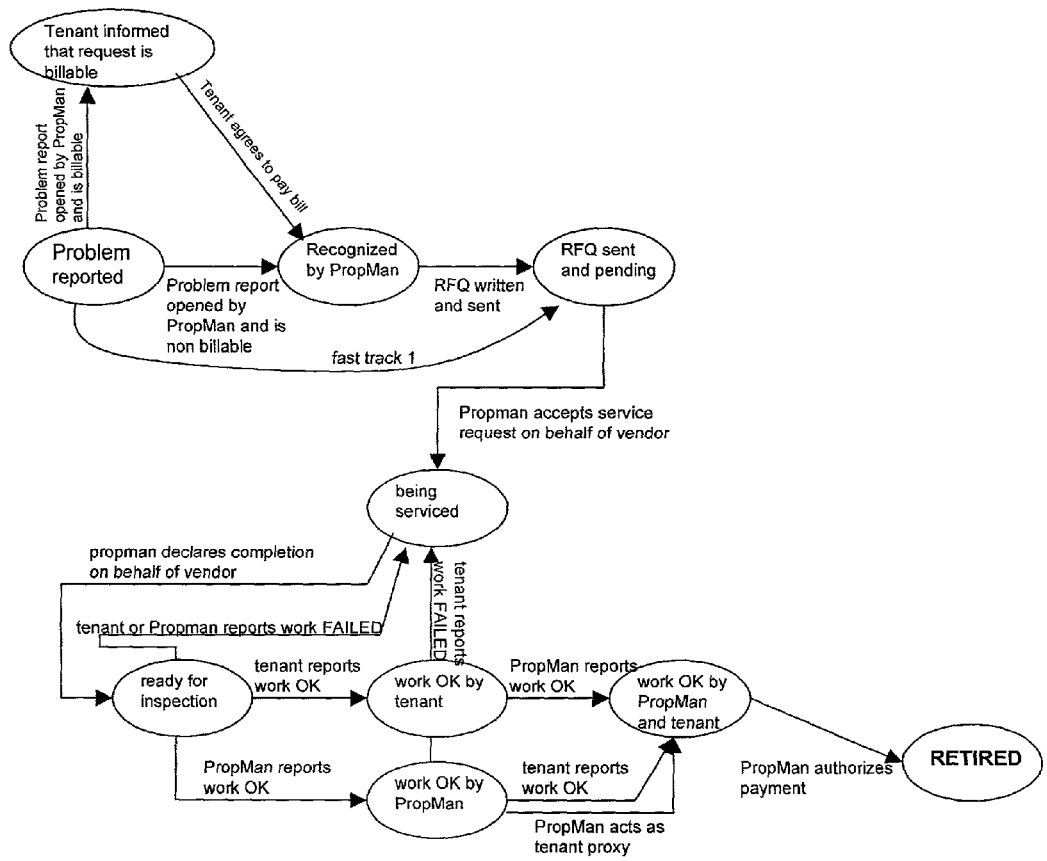
FIG. 18 is a state diagram illustrating an absentee vendor workflow in one embodiment of the present invention.

Turning to FIG. 18, in one embodiment of the present invention, a block diagram illustrating an absentee vendor workflow 1800, is shown. In one embodiment, the absentee vendor state machine, shown here in one embodiment, is superimposed on top of the basic state machine. The workflow that allows a property manager to assign an incident to a vendor who is not a property management system user. The benefit is that the vendor's relevant transactional data is captured and visible to other parties in the incident, i.e., tenants and peer property managers.

Figure 19:
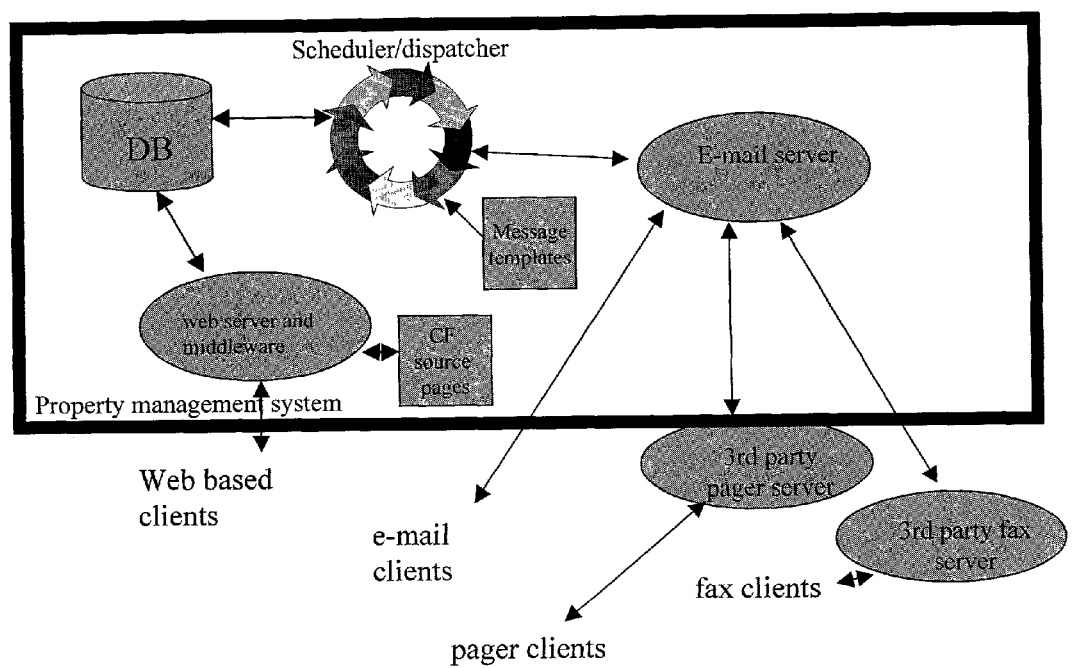
FIG. 19 is a block diagram illustrating a property management system in one embodiment of the present invention.

Turning to FIG. 19, in one embodiment of the present invention, a block diagram illustrating a property management system 1900, is shown. In one embodiment, the property management system is comprised of several large modules. The database ("DB") is a Structured Query Language, (known as "SQL") based Relational Data Base Management System ("RDBMS"). It serves as the repository for persistent storage of transactional and non-transactional data. The scheduler/dispatcher is a software application that forwards RFQs from the database to vendors as well as compiling and transmitting e-mail and other messages. E-mail messages are created by merging message templates with active contextual data from the database. The web server is compatible with middleware. The middleware is an application that dynamically compiles web page templates (CF source pages) with data retrieved from the database and passes completed standard HTML pages to the web server. The e-mail is processed by an e-mail server application. The third party pager server and third party fax server are examples of third party Internet-based applications that translate e-mail messages into other forms. The web-based clients are web browsers, in one embodiment, like those offered by Netscape Navigator. In one embodiment the e-mail client is a 3rd party e-mail reader like Netscape Messenger. An example of a fax client is a fax machine. An example of a pager client is a portable alphanumeric pager as manufactured by Motorola.

Figure 20:
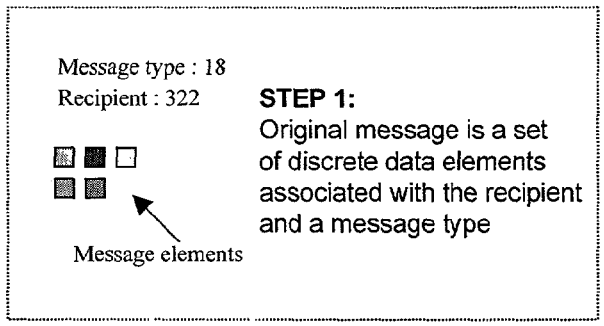
FIG. 20 is a block diagram illustrating a first part of accessing multiple recipient channels using e-mail workflow in one embodiment of the present invention.
Figure 20:
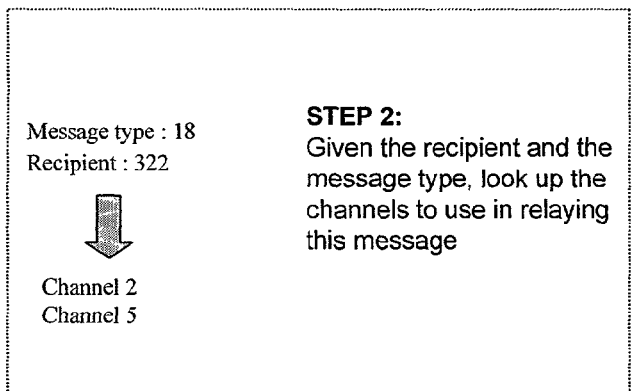
Figure 20:
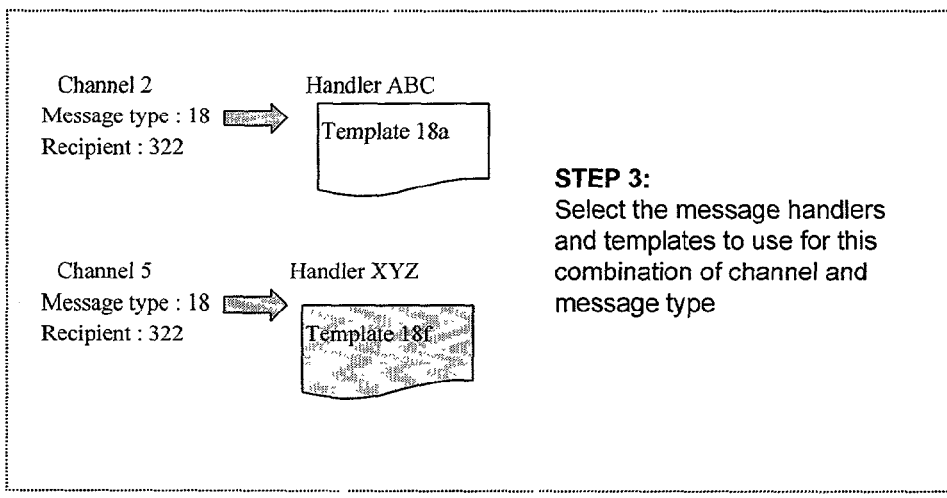
Figure 21:
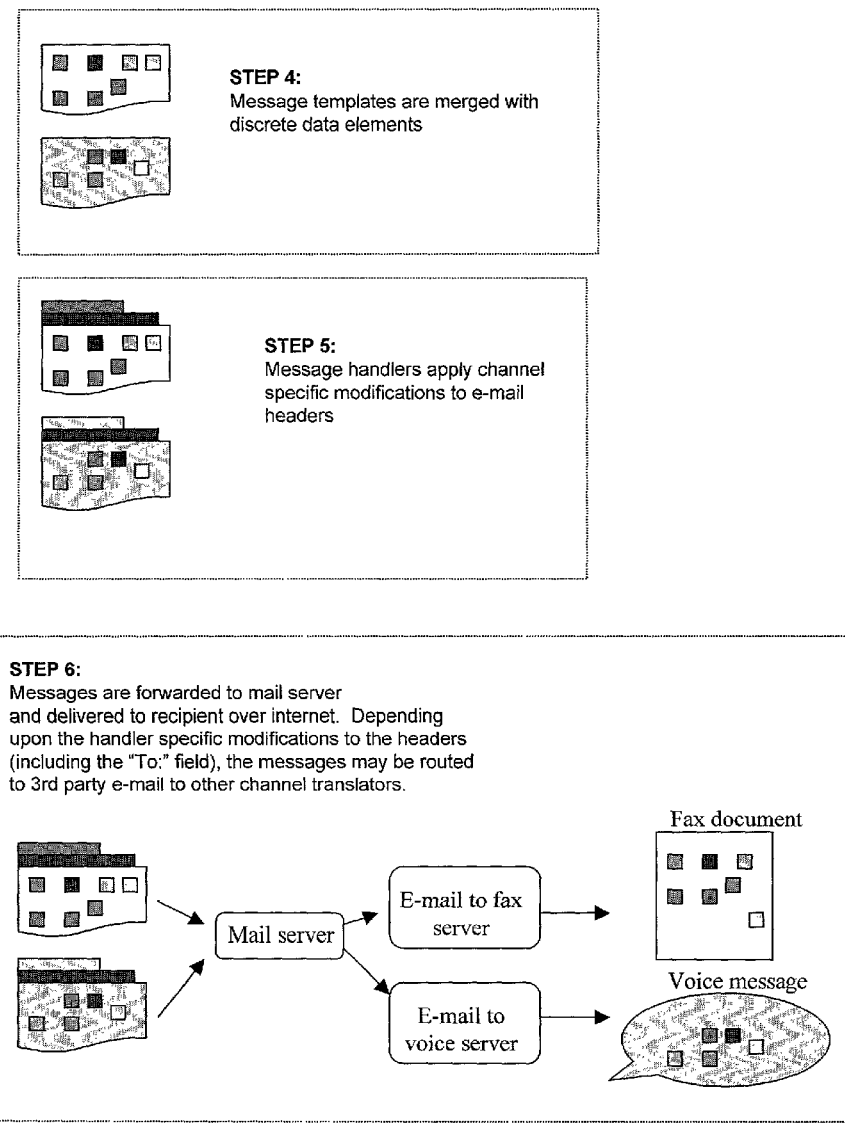
FIG. 21 is a block diagram illustrating a second part of accessing multiple recipient channels using e-mail workflow in one embodiment of the present invention.

Turning to FIGS. 20 and 21, in one embodiment of the present invention, a system and process for accessing multiple recipient channels using e-mail workflow, are shown. In FIG. 20, in one embodiment of the present invention, a block diagram illustrating a first part of accessing multiple recipient channels using e-mail workflow 2000, is shown. In FIG. 21, in one embodiment of the present invention, a block diagram illustrating a second part of accessing multiple recipient channels using e-mail workflow 2100, is shown. Many of the property management system's recipients' channels are accessible via e-mail. For example, the property management system can send an e-mail message to an email address associated with an alphanumeric pager or a Blackberry 2-way pager, Made by Blackberry. Because the type of the recipient's channel is encoded in the property management system database, the property management system can send messages to these channels and make the e-mail format modifications necessary for the message to arrive at the recipient's device. By using e-mail based message origination, the cost and complexity of the property management system message server is kept to a minimum. This task is implemented in the 'scheduler/dispatcher' module in the FIG. 19.

For purposes of illustration, the step of "done" in any figure may indicate a return to processing from the step that initiated the request or other steps waiting for the process to be completed.

We claim:

1. A computer-implemented method for a network-connected computer to relay at least part of a service request from a service requestor to a property manager, comprising the steps of:

receiving and storing a service request from a service requestor with the network-connected computer, the service request being transmitted electronically and being associated with a property having a management affiliation;

identifying, with a computer, a property manager by successively reviewing electronic data containing increasingly more general descriptions of the management affiliation of the property until a property manager is identified; and electronically relaying at least part of the service request from the service requestor to a computing device associated with the property manager.

2. The method of claim 1 wherein the identifying step is a hierarchical tree traversal search through successive hierarchical levels towards the root of a hierarchical tree.

3. The method of claim 1 wherein the service requestor is a tenant of the property associated with the service request, the tenant having access to the property management system.

4. A computer-implemented method for a network-connected computer to relay at least part of a service request from a service requestor to a property manager, comprising the steps of:
- receiving and storing a service request from a service requestor with the network-connected computer, the service request being transmitted electronically and being associated with a property having a management affiliation;
- identifying, with a computer, a property manager or property owner by successively reviewing electronic data containing increasingly more general descriptions of the management affiliation of the property until a property manager or property owner is identified; and
- electronically relaying at least part of the service request from the service requestor to a computing device associated with the property manager or property owner identified.

5. The method of claim 4 wherein the service requestor is a tenant of the property associated with the service request, the tenant having access to the property management system.

6. A computer-implemented method for a network-connected computer to relay at least part of a service request from a service requestor to a property manager, comprising the steps of:
- receiving and storing a service request from a service requestor with the network-connected computer, the service request being transmitted electronically and being associated with a property having a management affiliation;
- identifying, with a computer, a property manager or property owner by successively reviewing electronic data containing increasingly more general descriptions of the management affiliation of the property until a person other than the property manager is identified; and
- electronically relaying at least part of the service request from the service requestor to a computing device associated with the person other than the property manager.

7. The method of claim 6 wherein the service requestor is a tenant of the property associated with the service request, the tenant having access to the property management system.

* * * * *